US008959525B2

(12) United States Patent
Agarwal et al.

(10) Patent No.: US 8,959,525 B2
(45) Date of Patent: Feb. 17, 2015

(54) SYSTEMS AND METHODS FOR AFFINITY DRIVEN DISTRIBUTED SCHEDULING OF PARALLEL COMPUTATIONS

(75) Inventors: Shivali Agarwal, Uttar Pradesh (IN); Ankur Narang, New Delhi (IN); Rudrapatna K. Shyamasundar, Mambai (IN)

(73) Assignee: International Business Machines Corporation, Armonk, NY (US)

( * ) Notice: Subject to any disclaimer, the term of this patent is extended or adjusted under 35 U.S.C. 154(b) by 1285 days.

(21) Appl. No.: 12/607,497

(22) Filed: Oct. 28, 2009

(65) Prior Publication Data

US 2011/0099553 A1    Apr. 28, 2011

(51) Int. Cl.
*G06F 9/46* (2006.01)
*G06F 9/48* (2006.01)
*G06F 9/52* (2006.01)

(52) U.S. Cl.
CPC .............. *G06F 9/4881* (2013.01); *G06F 9/524* (2013.01); *G06F 2209/483* (2013.01)
USPC ....................................................... 718/105

(58) Field of Classification Search
CPC ...... G06F 9/5033; G06F 9/5083; G06F 9/505
See application file for complete search history.

(56) References Cited

U.S. PATENT DOCUMENTS

| 5,872,972 | A | 2/1999 | Boland |
| 6,105,053 | A * | 8/2000 | Kimmel et al. ............... 718/105 |
| 6,292,822 | B1 | 9/2001 | Hardwick |
| 6,823,351 | B1 | 11/2004 | Flood et al. |
| 7,103,887 | B2 | 9/2006 | Shvait et al. |
| 7,346,753 | B2 | 3/2008 | Chase |
| 7,363,438 | B1 | 4/2008 | Lev |
| 2008/0178183 | A1 | 7/2008 | Accapadi et al. |
| 2008/0244588 | A1 | 10/2008 | Leiserson |
| 2009/0031317 | A1 | 1/2009 | Gopalan et al. |
| 2009/0031318 | A1 | 1/2009 | Gopalan et al. |

FOREIGN PATENT DOCUMENTS

| JP | 2006502457 T | 1/2006 |
| WO | WO2005116832 A1 | 12/2005 |
| WO | 2008077267 | 7/2008 |

OTHER PUBLICATIONS

Acar et al., "The Data Locality of Work Stealing", SPAA '00, Proceedings of the 12th Annual ACM Symposium on Parallel Algorithms and Architectures, Jul. 9-12, 2000, pp. 1-12, Bar Harbor, Maine, USA.
Agarwal et al., "Deadlock-Free Scheduing of X10 Computations with Bounded Resources", SPAA '07, Proceedings of the 19th Annual ACM Symposium on Parallel Algorithms and Architectures, Jun. 9-11, 2007, pp. 229-240, San Diego, California, USA.
Blumofe et al., "Scheduling Multithreaded Computations by Work Stealing", Journal of the ACM, Sep. 1999, pp. 720-748, vol. 46, No. 5, ACM, New York, New York, USA.

(Continued)

*Primary Examiner* — Mengyao Zhe
(74) *Attorney, Agent, or Firm* — Ference & Associates LLC

(57) ABSTRACT

Embodiments of the invention provide efficient scheduling of parallel computations for higher productivity and performance. Embodiments of the invention provide various methods effective for affinity driven and distributed scheduling of multi-place parallel computations with physical deadlock freedom.

20 Claims, 16 Drawing Sheets

Distributed Scheduling

(56) References Cited

OTHER PUBLICATIONS

Dinanet, James al., "A Framework for Global-View Task Parallelism", Proceedings of the International Conference on Parallel Processing, p. 586-593, 2008, Proceedings—37th International Conference on Parallel Processing, ICPP 2008.

Gautier, Thierry et al, "KAAPI: A Thread Scheduling Runtime System for Data Flow Computations on Cluster of Multi-Processors", International Conference on Symbolic and Algebraic Computation Proceedings of the 2007 International Workshop on Parallel Symbolic Computation, London, Ontario, Canada, pp. 15-23, 2007.

Faxen, Karl-Filip et al, "Multicore Computing—The State of the Art, Swedish Institute of Computer Science", Dec. 3, 2008.

Videau Brice et al, "PaSTeL: Parallel Runtime and Algorithms for Small Datasets", Institute National De Recherche En Informatique Et En Automatique, No. 6650, Sep. 2008.

Motohashi, Takeshi et al., "An Activity-Based Parallel Execution Mechanism Using Distributed Activity Queues", Journal of Information Processing Society of Japan, Japan, Information Processing Society of Japan, Oct. 1994, pp. 2128-2137, vol. 35, No. 10, NII—Electronic Library Service.

Saito, Hideo et al., "Locality-aware Connection Management and Rank Assignment for Wide-area MPI", Journal of Information Processing Society of Japan, Japan, Information Processing Society of Japan, May 23, 2007, pp. 44-45, vol. 48, No. SIG 18, NII—Electronic Library Service.

Saito, Hideo et al., "Locality-Aware Connection Management and Rank Assignment for Wide-Area MPI", Principles and Practice of Parallel Programming (PPoPP'07), Mar. 14-17, 2007, San Jose, CA, USA, pp. 150-151, ACM Digital Library.

* cited by examiner

The following notations are used in the paper:

- $P = \{P_1, \ldots, P_n\}$ denote the set of places.
- $\{W_i^1, W_i^2, \ldots W_i^m\}$ denote the set of workers at place $P_i$.
- $S_l$ denotes the space required by a single processor execution schedule.
- $S_{max}$ denotes the size in bytes of the largest activation frame in the computation.
- $D_{max}$ denotes the maximum depth of the computation tree in terms of number of activities.
- $T_{\infty,n}$ denotes the execution time of the computation DAG over $n$ places with infinite processors at each place.
- $T_\infty^k$ denotes the execution time for activities assigned to place $P_k$ using infinite processors. Note that, $T_{\infty,n} \leq \sum_{1 \leq k \leq n} T_\infty^k$.
- $T_1^k$ denotes the minimum time taken by a single processor for the activities assigned to place $k$.

Definitions & Notations

FIG. 1

Place-annotated Computation DAG

Distributed Scheduling

At any step, an activity $A$ at the $r^{th}$ worker (at place $i$) $W_i^r$, may perform following actions:

1. Spawn:
   (a) $A$ spawns activity $B$ at place $P_j$, $i \neq j$. $A$ sends $AM(B)$ (active message for $B$) to the remote place. Since, the remote place, $P_j$, is guaranteed to have memory for activity $B$, it is successfully inserted in the FAB at $P_j$ and $A$ continues execution (Fig.2(b)).
   (b) $A$ spawns $B$ locally. $B$ is successfully created and starts execution whereas $A$ is pushed into the bottom of the Ready Deque.

2. Terminates ($A$ terminates): The worker at place $P_i$, $W_i^r$, where $A$ terminated, picks an activity from the bottom of the Ready Deque for execution. If none available in its Ready Deque, then it steals from the top of other workers' Ready Deque. Each failed attempt to steal from another worker's Ready Deque is followed by attempt to get the topmost activity from the FAB at that place. If there is no activity in the FAB then another victim worker is chosen from the same place.

3. Stalls ($A$ stalls): An activity may stall due to dependencies in which case it is put in the stall buffer in a stalled state. Then same as *Terminates* (case 2) above.

4. Enables ($A$ enables $B$): The termination of an activity $A$ may enable a stalled activity $B$ in which case the state of $B$ changes to enabled and it is pushed onto the top of the Ready Deque.

Distributed Scheduling Process

FIG. 3

Each worker has the following data-structures (Fig. 5(a)):

- PrQ and StallBuffer: $PrQ$ is a priority queue that contains activity in *enabled* state and *local-stalled* state. The StallBuffer contains activities in *depend-stalled* and *remote-stalled* states. The total size of both these data-structures together is $O(D_{max} \cdot S_{max})$ bytes.
- Ready Deque: Also referred to as Deque, this contains activities in the current executing path on this worker. This has total space of $O(S_1)$ bytes.
- AMRejectMap: This is a one-to-one map from a place-id, say $P_j$, to the tuple $[U, AM(V), head, tail]$. This tuple contains, $AM(V)$, the active message rejected in a remote-spawn attempt at place $P_j$; $U$, the activity stalled due to the rejected active message and head and tail of the linked list of activities in *remote-stalled* state due to lack of space on the place, $P_j$. This map occupies $O(n \cdot S_{max})$ space per worker.

Each place $P_i$, has the following data-structures (Fig. 5(a)):

- FAB: This is a concurrent priority queue that is managed by a dedicated processor (different from workers). It contains the fresh activities spawned by remote places onto this place. It occupies $O(D_{max} \cdot S_{max})$ bytes per place.
- WorkRejectMap: This is a one-to-many map from depth to list of workers. For each depth, this map contains the list of workers whose spawns were rejected from the place. It occupies $O(m \cdot n + D_{max})$ space.

The priority queue (used for $PrQ$ and $FAB$) uses the *depth* of an activity as the priority with higher depth denoting higher priority. The *depth* of an activity is defined as the distance from the root activity in the computation tree.

Multi-Place Distributed Data Structures

FIG. 4

Distributed Data Structures for Bounded Space Scheduling Process

At any time, a worker $W_i^r$ takes the following actions. It might be executing an activity $T(@depth\ D_t)$.

1. *Local Spawn*: $T$ spawns activity $U$ locally. $T$ is pushed to the bottom of the Deque. $U$ starts executing.
2. *Remote Spawn*: $T$ attempts remote spawn of $U(@depth\ D_u)$ at a remote place $P_j$, $i \neq j$
   // Refer Remote Spawn Case in Fig. 5(b)
3. *Receives Notification*: $W_i^r$ receives notification from place $P_j$ on available space for spawn (a) Get pair $< P_j, < R, AM(V), head(U), tail(S) >>$ from $AMRejectMap(i,r)$.
   (b) Send the tuple, $< AM(V), U >$, to Place $P_j$.
   (c) Activity Enabled case for $R$. //Put $R$ in $PrQ_i^r$.
   (d) Update head in the tuple for the pair with key as $P_j$ as: $head = U \rightarrow Next()$.

4. *Termination*: $T$ terminates

• If($Deque(i,r)$ is non-empty) then Pick the bottommost activity from $Deque(i,r)$
   • else ( Same as case *Empty Deque*. )

5. *Empty Deque*: $W_i^r$ has an empty deque // Refer Empty Deque Case in Fig. 5(b)
6. *Activity Enabled*: activity $U$ gets enabled (a) Set state of $U$ to enabled. //no update for space
   (b) Insert $U$ in $PrQ_i^r$.

7. *Activity Stalled*: $T(@depth\ D_t)$ stalls
   Let $U(@depth\ D_u)$ be the next bottommost activity in $Deque(i,r)$.

• State of $T$ is changed to an appropriate stalled state. $T$ is removed from $Deque$. If $T$ is in *local-stalled* state (due to lack of space at worker) then it is moved into $PrQ$ else it is moved into *StallBuffer*. Update $B_i^r$. $B_i^r = B_i^r - S_{max}$.
   • if($B_i^r > ((D_{max} - D_u) \cdot S_{max})$) {Execute $U$.}
   • else ( Activity Stalled case for $U$.)

Multi-place Distributed Scheduling Algorithm

FIG. 6

At any step, an activity $A$ at the $r^{th}$ worker (at place $i$) $W_i^r$, may perform following actions:

1. Spawn:
   (a) $A$ spawns activity $B$ at place $P_j$, $i \neq j$. $A$ sends $AM(B)$ (active message for $B$) to the interface processor at the remote place. Since, the remote place, $P_j$, is guaranteed to have memory for activity $B$, it is successfully inserted in the FAB at $P_j$ and $A$ continues execution (Fig. 1(b)).
   (b) $A$ spawns $B$ locally. $B$ is successfully created and starts execution whereas $A$ is pushed into the bottom of the APR Deque if $A$ is an anyplace activity else push $A$ into the bottom of the AFR Deque.

2. Terminates ($A$ terminates): The worker at place $P_j$, $W_j^r$, where A terminated, picks an activity from the bottom of the AFR Deque for execution. If none available in its AFR Deque, then it picks activity from the bottom of APR Deque. If none obtained then same as *Empty Deque* (case 3) below.

3. Empty Deque: Worker $W_i^r$ has both AFR Deque and APR Deque as empty.
   (a) *Local Stealing*: Worker attempts stealing from the top of other local workers' AFR Deque or APR Deque. If successful, start execution of stolen activity and update WLB, else attempt pick from FAB.
   (b) *Pick from Fab*: Pick from FAB at place $P_j$. If successful, start execution of new activity and update FAB, else attempt remote stealing.
   (c) *Remote Stealing*: Worker attempts to steal from remote place chosen randomly, $P_j$. $W_i^r$ send remote steal request to interface processor at $P_j$. Interface processor looks at the WLB at place $P_j$ and attempts local steal of anyplace activity from available worker, $W_j^a$. If this succeeds it passes this stolen activity to the worker, $W_i^r$, which requested remote steal and updates WLB at $P_j$. $W_i^r$ starts execution of stolen anyplace activity (Fig. 1(b)). If remote steal fails (no available anyplace activity) then repeat from start *Empty Deque* (case 3).

4. Stalls ($A$ stalls): An activity may stall due to dependencies in which case it is put in the stall buffer in a stalled state. Then same as *Terminates* (case 2) above.

5. Enables ($A$ enables $B$): The termination of an activity $A$ may enable a stalled activity $B$ in which case the state of $B$ changes to enabled and it is pushed onto enabled and it is pushed onto the top of the APR Deque if it is an anyplace activity else it is pushed on top of the AFR Deque.

FIG. 8

Each worker has the following data-structures (Fig. 11)

— AF PrQ, AP PrQ and StallBuffer. $AF\ PrQ$ and $AP\ PrQ$ are priority queues that contain AF activities and AP activities respectively. These activities can be either in ready state or local-stalled state. The StallBuffer contains activities in depend-stalled and remote-stalled states. The total current size of all these three data-structures is denoted by $B'_i$ and is kept bounded by $O(D_{max} \cdot S_{max})$ bytes.

— AFR Deque. This contains AF activities (affinity annotated activities) in the current executing path on this worker. This has total space of $O(S_1)$ bytes.

— APR Deque. This contains AP activities (anyplace activities) in the current executing path on this worker. This has total space of $O(S_1)$ bytes.

— AMRejectMap. This is a one-to-one map from a place-id, say $P_j$, to the tuple $[U, AM(V), head, tail]$. This tuple contains, $AM(V)$, the active message rejected in a remote-spawn attempt at place $P_j$; $U$, the activity stalled due to the rejected active message and head and tail of the linked list of activities in remote-stalled state due to lack of space on the place, $P_j$. This map occupies $\lambda(n \cdot S_{max})$ space per worker.

Each place $P_i$ has the following data-structures (Fig. 11)

— WLB. Work list Buffer is a map from activity depth to list of workers. This can be implemented using a concurrent red-black tree and is managed by the interface processor. WLB is used to respond efficiently to remote steal requests coming from other places by providing instant list of available workers that have at least one AP activity to steal of the given or higher depth. From each worker the depth of the highest AP activity available to be stolen is kept at the WLB. It needs to be kept updated with updates onto $AP\ PrQ$ and $AP\ Deque$ of the workers at that place. It occupies $O(D_{max} + m)$ bytes in space.

— FAB. Fresh Activity Buffer is a concurrent priority queue that is managed by the interface processor. It contains the fresh AF activities spawned by remote places onto this place. The current size of FAB is denoted by $F_i$ and is bounded by $O(D_{max} \cdot S_{max})$ bytes.

— WorkRejectMap. This is a one-to-many map from depth to list of workers. For each depth this map contains the list of workers whose spawns were rejected from the place. It occupies $O(m \cdot n + D_{max})$ space.

The priority queue (used for $AF\ PrQ$, $AP\ PrQ$ and FAB) uses the depth of an activity as the priority with higher depth denoting higher priority. The depth of an activity is defined as the distance from the root activity in the computation tree.

FIG. 10

At any time, a worker $W_j$ takes the following actions. It might be executing an activity $T$ (@depth $D_t$).

1. *Local Spawn:* $T$ spawns activity $U$ locally. $T$ is pushed to the bottom of the AF Deque or AP Deque depending upon whether $T$ is an AF activity or AP activity respectively. $U$ starts executing.
2. *Remote Spawn:* $T$ attempts remote spawn of $U$ (@depth $D_u$) at a remote place $P_j$, $i \neq j$ // Refer Remote Spawn Case Chart in Fig. 5(b)
3. *Receives Notification:* $W_j^r$ receives notification from place $P_j$ on available space for spawn
   (a) Get pair $<P_j, <R, AM(V), head(U), tail(S) >>$ from $AMRejectMap(i,r)$.
   (b) Send the tuple, $< AM(V), U >$, to Place $P_j$. Put $R$ in $AFPrQ(i,r)$ or $APPrQ(i,r)$ depending upon whether $R$ is an AF activity or AP activity.
   (c) Update head in the tuple for the pair with key as $P_j$ as: head = $U \rightarrow$ Next().
4. *Termination:* $T$ terminates
   — if $(AF\;Deque(i,r)$ is non-empty) then pick the bottommost activity from AF Deque(i,r).
   — else if(AP Deque(i,r) is non-empty) then pick the bottommost activity from AF Deque(i,r)
   — else {Same as case Empty Deque}
5. *Empty Deque:* $W_j^r$ has both AF Deque and AP Deque as empty
   // Refer Empty Deque Case flow Chart in Fig. 5(b)
6. *Activity Enabled:* activity $U$ gets enabled.
   (a) Set state of $U$ to enabled.
   (b) Insert $U$ in $AFPrQ(i,r)$ or $APPrQ(i,r)$ depending upon whether $U$ is an AF activity or AP activity.
   (c) if(activity enabled was in state remote-stalled) then perform other actions as in the case Receives Notification.
7. *Activity Stalled:* $T$ (@depth $D_t$) stalls
   Let $U$ (@depth $D_u$) be the next bottommost activity in Deque(i,r).
   State of $T$ is changed to an appropriate stalled state. $T$ is removed from AF Deque / AP Deque. If $T$ is in local-stalled state (due to lack of space at worker) then it is moved into AF PrQ or AP PrQ else it is moved into StallBuffer. Update $B_j^r$. $B_j^r \leftarrow B_j^r - S_{max}$.
   — if($B_j^r > ((D_{max} - D_u) \cdot S_{max}))$ {Execute $U$.}
   — else {Activity Stalled case for $U$.}

FIG. 12

| Algorithm | Scheduling Algorithm | Affinity | Nature of Computation | MP vs. SP | DM vs. MPM | Sync. Overheads | DG Mode | IAP vs. Both | DF:BS:BT |
|---|---|---|---|---|---|---|---|---|---|
| Blumofe Work Stealing | WS | N | FS | Both | DM,MPM | L | N/A | IAP | Y:Y:Y |
| Plaxton | WS | N | G | SP | MPM | L | N/A | IAP | Y:N:Y |
| Blelloch | WS | L | NP, IDP | SP(HSMSs) | DM | H | N/A | IAP | Y:Y:Y |
| Shavit | WD | Y | G | small SP | DM | L | N/A | N/A | Y:Y:Y |
| Girija | DFS, WS | L | NP, IDP | SP | DM | L | N/A | IAP | Y:Y:Y |
| Kunal | WS | N | FS | SP | MPM | L | N/A | IAP | Y:Y:Y |
| SPAA07(i) | WS | N | TS | SP | DM | L | N/A | IAP | Y:Y:N |
| SPAA07(ii) | WP | Y | TS | MP(m=1) | DM | H | Yes | None | Y:Y:N |
| DSA-I | WS, WP | Y | G | MP(m>1) | DM | L | No | IAP | Y:N:Y |
| DSA-II | WS, WP | Y | TS | MP(m>1) | DM | L-M | No | IAP | Y:Y:Y |

Comparison of Scheduling Approaches

FIG. 13

SYSTEMS AND METHODS FOR AFFINITY DRIVEN DISTRIBUTED SCHEDULING OF PARALLEL COMPUTATIONS

BACKGROUND

Languages such X10, Chapel and Fortress, which are based on a partitioned global address (PGAS) paradigm, have been designed and implemented as part of the Defense Advanced Research Projects Agency High Productivity Computing Systems (DARPA HPCS) program for higher productivity and performance on many-core and massively parallel platforms. Nonetheless, many-core and massively parallel platforms have significant drawbacks related to scheduling of parallel computations.

BRIEF SUMMARY

Embodiments of the invention provide efficient scheduling of parallel computations for higher productivity and performance. Embodiments of the invention provide various methods effective for affinity driven distributed scheduling of multi-place ("place" is a group of processors with shared memory) parallel computations with physical deadlock freedom. Embodiments of the invention provide an online affinity driven distributed scheduling process for strict place annotated multi-threaded computations that assumes unconstrained space. Moreover, embodiments of the invention provide a novel affinity driven online distributed scheduling process assuming bounded space per place.

In summary, one aspect of the invention provides an apparatus comprising: one or more processors; and a computer readable storage medium having computer readable program code embodied therewith and executable by the one or more processors, the computer readable program code comprising: computer readable program code configured to provide online distributed affinity driven scheduling of multi-place computations in a deadlock free manner for one or more places, the one or more places each comprising one or more processors having shared memory.

Another aspect of the invention provides a method comprising: utilizing one or more processors to execute a program of instructions tangibly embodied in a program storage device, the program of instructions comprising: computer readable program code configured to provide online distributed affinity driven scheduling of multi-place computations in a deadlock free manner for one or more places, the one or more places each comprising one or more processors having shared memory.

A further aspect of the invention provides a computer program product comprising: a computer readable storage medium having computer readable program code embodied therewith, the computer readable program code comprising: computer readable program code configured to provide online distributed affinity driven scheduling of multi-place computations in a deadlock free manner for one or more places, the one or more places each comprising one or more processors having shared memory.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 1 illustrates some definitions and notations according to an embodiment of the invention.

FIG. 3 illustrates distributed scheduling process according to an embodiment of the invention.

FIG. 4 illustrates distributed data structures according to an embodiment of the invention.

FIG. 6 illustrates multi-place distributed scheduling according to an embodiment of the invention.

FIG. 8 illustrates distributed scheduling according to an embodiment of the invention.

FIG. 10 illustrates multi-place distributed data structures according to an embodiment of the invention.

FIG. 12 illustrates multi-place distributed scheduling according to an embodiment of the invention.

FIG. 13 presents an exemplary comparison between different scheduling approaches and those according to embodiments of the invention.

DETAILED DESCRIPTION

Figure 2A:
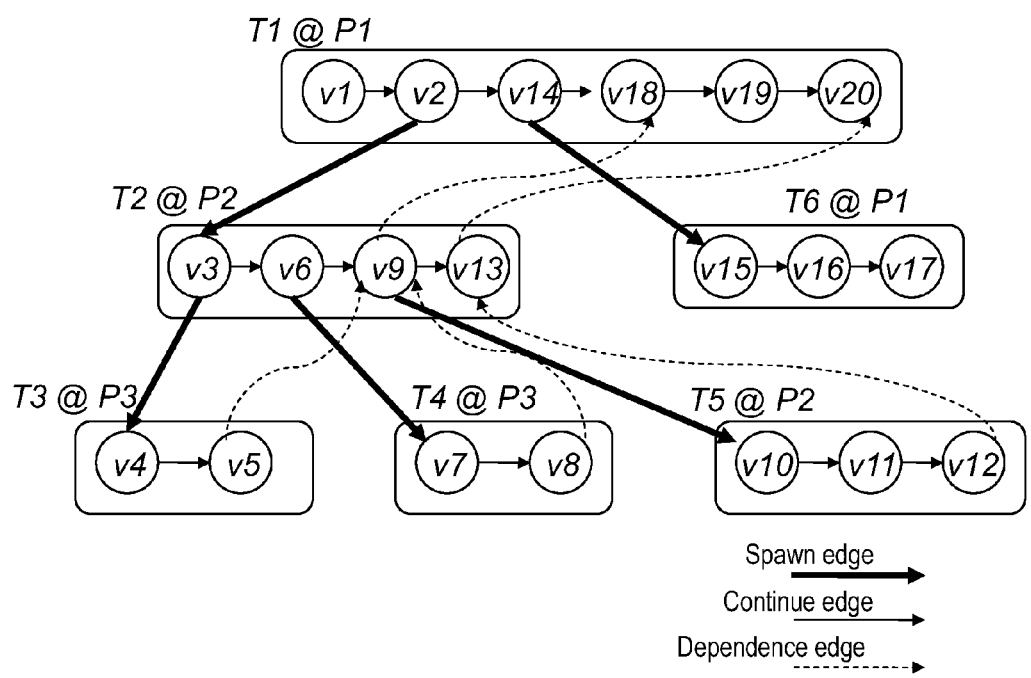
FIG. 2(A-B) illustrates a place annotated computation DAG and a distributed scheduling process according to an embodiment of the invention.

It will be readily understood that the components of the embodiments of the invention, as generally described and illustrated in the Figures herein, may be arranged and designed in a wide variety of different configurations in addition to the described exemplary embodiments. Thus, the following more detailed description of the embodiments of the invention, as represented in the Figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The inventors have recognized that with the advent of multi-core and many-core architectures, scheduling of parallel programs for higher productivity and performance has become an important problem. Languages such X10, Chapel and Fortress which are based on PGAS paradigm, and have been designed and implemented as part of DARPA HPCS program for higher productivity and performance on many-core and massively parallel platforms. These languages have in-built support for initial placement of threads (also referred to as activities) and data structures in the parallel program and therefore locality comes implicitly with the programs. The run-time system of these languages needs to provide algorithmic online scheduling of parallel computations with medium to fine grained parallelism. For handling large parallel computations, the scheduling algorithm should be designed to work in a distributed fashion on many-core and massively parallel architectures. Further, it should ensure physical deadlock free execution under bounded space. It is assumed that the parallel computation does not have any logical deadlocks due to control, data or synchronization dependencies, so physical deadlocks can only arise due to cyclic dependency on bounded space. This is a very challenging problem since the distributed scheduling algorithm needs to follow affinity and provide efficient space and time complexity along with distributed deadlock freedom.

The description now turns to the Figures. The illustrated embodiments of the invention will be best understood by reference to the Figures. The following description is intended only by way of example and simply illustrates certain selected exemplary embodiments of the invention as claimed herein.

The flowchart and block diagrams in the Figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The two affinity driven distributed scheduling problems addressed herein are as follows. Given: (a) An input computation DAG (FIG. 2(A)) that represents a parallel multi-threaded computation with fine to medium grained parallelism. Each node in the to DAG is a basic operation such as and/or/add etc. and is annotated with a place identifier which denotes where that node should be executed. The edges in the DAG represent (i) spawn of a new thread or, (ii) sequential flow of execution or, (iii) synchronization dependency between two nodes; (b) A cluster of n SMPs (each SMP also referred as place has fixed number(m) of processors and memory) as the target architecture on which to schedule the computation DAG. To Solve: For both problems, one needs to generate a schedule for the nodes of the computation DAG in an online and distributed fashion that ensures exact mapping of nodes onto places as specified in the input DAG. Specifically, for the first problem it is assumed that the input is a strict computation DAG (synchronization dependency edges in the input DAG go only between a thread and its ancestor thread) and there is unconstrained space per place. Here, one needs to generate an online schedule for the nodes in the computation DAG while minimizing the time and message complexity. For the second problem, it is assumed that the input is a terminally strict parallel computation DAG (synchronization dependency edge represents an activity waiting for the completion of a descendant activity) and the space per place is bounded. Here, the aim is to generate an online schedule that ensures physical deadlock free execution while keeping low time and message complexity for execution.

Thus, consistent with various embodiments of the invention, herein are presented affinity driven distributed scheduling processes and proven space, time and message bounds while guaranteeing deadlock free execution. The processes assume initial placement of annotations on the given parallel computation with consideration of load balance across the places. The processes control the online expansion of the computation DAG based on available resources. They use efficient remote spawn and reject handling mechanisms across places for ensuring affinity. Randomized work stealing within a place helps load balancing. The distributed scheduling process for bounded space carefully manages space for execution in a distributed fashion using estimated computation depth based ordering of threads/activities. The distributed deadlock avoidance strategy ensures deadlock free execution of the parallel computation. These processes can be easily extended to variable number of processors per place and also to mapping of multiple logical places in the program to the same physical place, provided the physical place has sufficient resources.

Herein are proposed novel affinity driven distributed scheduling processes for both unconstrained and bounded space per place. The bounded space process is designed for terminally strict multi-place computations and ensures physical deadlock free execution using a novel distributed deadlock avoidance strategy. Presented herein is a space bound and deadlock freedom proof for this process.

It is shown herein that for the unconstrained space process, the lower bound on the expected execution time is $O(\max_k T_1^k/m + T_{\infty,n})$ and the upper bound is $O(\Sigma_k(T_1^k/m + T_{\infty}^k))$; where k is a variable that denotes places from 1 to n, m denotes the number of processors per place, $T_1^k$ denotes the execution time for place k using a single processor, and $T_{\infty,n}$ denotes the execution time of the computation on n places with infinite processors on each place. Expected and probabilistic lower and upper bounds for message complexity are also discussed herein.

Scheduling of dynamically created tasks for shared memory multi-processors has been a well-studied problem. Previous work promoted the strategy of randomized work stealing. Here, a processor that has no work (processor that has no work) randomly steals work from another processor (victim) in the system. Other work demonstrated efficient bounds on space ($O(P \cdot S_1)$) and time ($O(T_1/P + T_{\infty})$) for scheduling of fully-strict computations in an SMP platform; where P is the number of processors, $T_1$ and $S_1$ are the time and space for sequential execution respectively, and $T_{\infty}$ is execution time on infinite processors. Subsequently, the importance of data locality for scheduling threads motivated work stealing with data locality wherein the data locality was discovered on the fly and maintained as the computation progressed. This work also explored initial placement for scheduling and provided experimental results to show the usefulness of the approach; however, affinity was not always followed, the scope of the algorithm was limited to SMP environments and its time complexity was not analyzed. Other work did analyze time complexity ($O(T_1/P + T_{\infty})$) for scheduling general parallel computations on SMP platform but did not consider space or message complexity bounds. Herein, embodiments of the invention consider distributed scheduling problems across muliple places (cluster of SMPs) while ensuring affinity and also providing time and message bounds.

Other prior work considers work-stealing algorithms in a distributed-memory environment, with adaptive parallelism and fault-tolerance. Here task migration was entirely pull-based (via a randomized work stealing algorithm); hence, it ignored affinity and also didn't provide any formal proof for the deadlock-freedom or resource utilization properties. Prior work also described a multi-place (distributed) deployment for parallel computations for which initial placement based scheduling strategy is appropriate. A multi-place deployment has multiple places connected by an interconnection network where each place has multiple processors connected as in an SMP platform. This work showed that online greedy scheduling of multithreaded computations may lead to physical deadlock in presence of bounded space and communication resources per place. Bounded resources (space or communication) can lead to cyclic dependency amongst the places that can lead to physical deadlock. Prior work also provided a scheduling strategy based on initial placement and proved space bounds for physical deadlock free execution of terminally strict computations by resorting to a degenerate mode called Doppelganger mode. The computation did not respect affinity in this mode and no time or communication bounds were provided. Also, the aspect of load balancing was not addressed. Embodiments of the invention ensure affinity while guaranteeing deadlock free distribution scheduling in a multi-place setup. Scheduling of hybrid parallel computations where some activities in the computation have place affinity while other activities in the computation can be executed on any place has been considered. This work has a specific focus on prioritized random work stealing across places and it leverages the detailed results on deadlock freedom for the bounded space algorithm and the time and message complexity for unconstrained space algorithm presented in this paper. Tabular comparison of features between the processes according to embodiments of the invention and previous work are presented herein.

System and Computation Model

According to embodiments of the invention, the system on which the computation DAG is scheduled is assumed to be a cluster of SMPs connected by an Active Message Network. Each SMP is a group of processors with shared memory. Each SMP is also referred to as place herein. Active Messages (AM) is a low-level lightweight RPC (remote procedure call) mechanism that supports unordered, reliable delivery of matched request/reply messages. It is assumed that there are n places and each place has m processors (also referred to as workers herein).

The parallel computation, to be dynamically scheduled on the system, is assumed to be specified by the programmer in languages such as X10 and Chapel. To describe the distributed scheduling processes consistent with exemplary embodiments of the invention, it is assumed that the parallel computation has a DAG (directed acyclic graph) structure and consists of nodes that represent basic operations like and, or, not, add and others. There are edges between the nodes in the computation DAG (FIG. 2(A)) that represent creation of new activities (spawn edge), sequential execution flow between nodes within a thread/activity (continue edge) and synchronization dependencies (dependence edge) between the nodes. Herein the parallel computation to be scheduled is referred to as the computation DAG. At a higher level the parallel computation can also be viewed as a computation tree of activities. Each activity is a thread (as in multi-threaded programs) of execution and consists of a set of nodes (basic operations).

Each activity is assigned to a specific place (affinity as specified by the programmer). Hence, such a computation is called multi-place computation and DAG is referred to as place-annotated computation DAG (FIG. 2(A): v1 ... v20 denote nodes, T1 ... T6 denote activities and P1 ... P3 denote places). The types of parallel computations based on the nature of dependencies in the computation DAG and the notations used are described in FIG. 1(A-B).

Distributed Scheduling in Unconstrained Space

Herein is presented a description of affinity driven distributed scheduling in unconstrained space consistent with embodiments of the invention. Consider a strict place-annotated computation DAG. The distributed scheduling process described below schedules activities with affinity at only their respective places. Within a place, work stealing is enabled to allow load-balanced execution of the computation sub-graph associated with that place. The computation DAG unfolds in an online fashion in a breadth-first manner across places when the affinity driven activities are pushed onto their respective remote places. Within a place, the online unfolding of the computation DAG happens in a depth-first manner to enable efficient space and time execution. Since sufficient space is guaranteed to exist at each place, physical deadlocks due to lack of space cannot happen in this process.

Figure 2B:
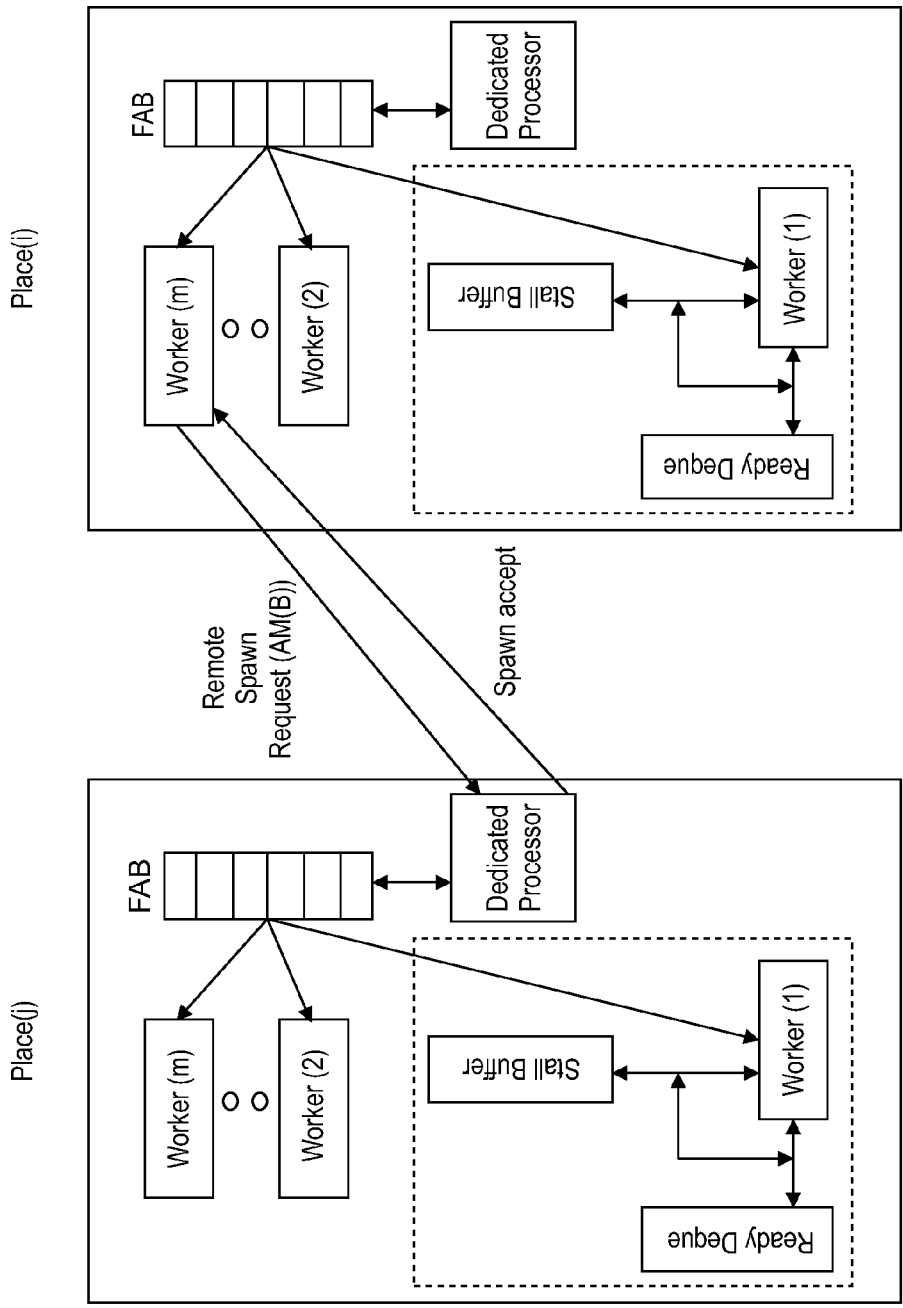

Each place maintains Fresh Activity Buffer (FAB) which is managed by a dedicated processor (different from workers) at that place. Each worker at a place has a Ready Deque and Stall Buffer (refer FIG. 2(B)). The FAB at each place as well as the Ready Deque at each worker use concurrent deque implementation. An activity that has affinity for a remote place is pushed into the FAB at that place. An idle worker at a place will attempt to randomly steal work from other workers at the same place (randomized work stealing). Note that an activity which is pushed onto a place can move between workers at that place (due to work stealing) but can not move to another place and thus obeys affinity at all times. An exemplary distributed scheduling process is illustrated in FIG. 3.

Distributed Scheduling in Bounded Space

Due to limited space on real systems, the distributed scheduling process has to limit online breadth first expansion of the computation DAG while minimizing the impact on execution time and simultaneously providing deadlock freedom guarantee. This process uses a distributed deadlock avoidance scheme. Due to space constraints at each place in the system, the activities can be stalled due to lack of space. The process keeps track of stack space available on the system and that required by activities for execution (heap space is not considered for simplicity). The space required by an activity u is bounded by the maximum stack space needed for its execution, that is $((D_{max}-D_u) \cdot S_{max})$, where $D_{max}$ is the maximum activity depth in the computation tree and $D_u$ is the depth of u in the computation tree. The process follows depth based ordering of computations for execution by allowing the activities with higher depth on a path to execute to completion before the activities with lower depth on the same path. This happens in a distributed fashion. Both during work-pushing and intra-place work stealing, each place and worker checks for availability of stack space for execution of the activity. Due to depth based ordering, only bounded number of paths in the computation tree are expanded at any point of time. This bound is based on the available space in the system. Using this distributed deadlock avoidance scheme, the system always has space to guarantee the execution of a certain number of paths, that can vary during the execution of the computation DAG.

To provide good time and message bounds the distributed deadlock avoidance scheme is designed to have low communication cost while simultaneously exposing maximal concurrency inherent in the place-annotated computation DAG. This scheme ensures deadlock free execution for terminally strict multi-place computations. When an activity is stalled due to lack of space at a worker, it moves into local-stalled state. When an activity is stalled as it cannot be spawned onto a remote place, it moves into remote-stalled state. An activity that is stalled due to synchronization dependencies, it moves into depend-stalled state.

It is assumed that maximum depth of the computation tree (in terms of number of activities), $D_{max}$, can be estimated fairly accurately prior to the execution from the parameters used in the input parallel computation. $D_{max}$ value is used in a distributed scheduling process to ensure physical deadlock free execution. The assumption on knowledge of $D_{max}$ prior to execution holds true for the kernels and large applications of the Java® Grande Benchmark suite. The $D_{max}$ for kernels including LUFact (LU factorization), Sparse (Sparse Matrix multiplication), SOR (successive over relaxation for solving finite difference equations) can be exactly found from the dimension of input matrix and/or number of iterations. For kernels such as Crypt (International Data Encryption Algorithm) and Series (Fourier coefficient analysis) the $D_{max}$ again is well defined from the input array size. The same holds for applications such as Molecular Dynamics, Monte Carlo Simulation and 3D Ray Tracer. Also, for graph kernels in the SSCA#2 benchmark, $D_{max}$ can be known by estimating $\Delta_g$ (diameter) of the input graph (for example, O(polylog(n)) for R-MAT graphs, O($\sqrt{n}$) for DIMACS graphs).

Distributed Data-Structures & Process Design

Figure 5A:
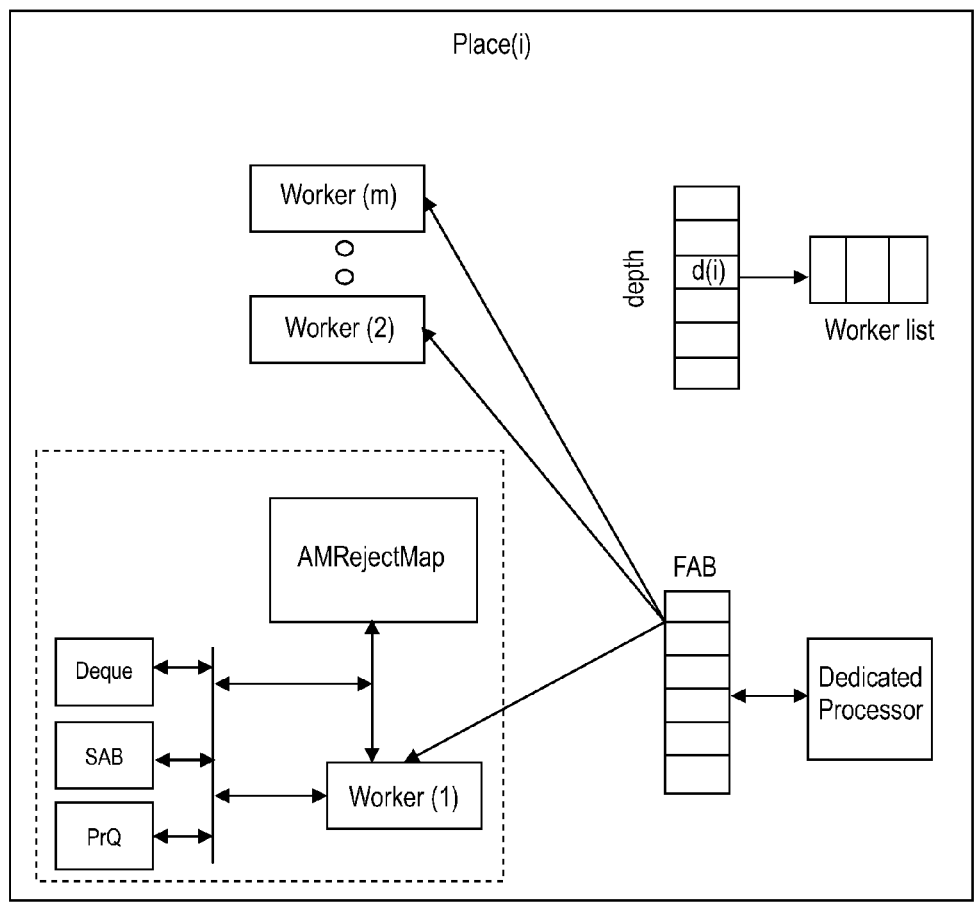
FIG. 5 (A-B) illustrates distributed data structures for bounded space scheduling and Remote Spawn and Empty Deque cases according to an embodiment of the invention.
Figure 5B:
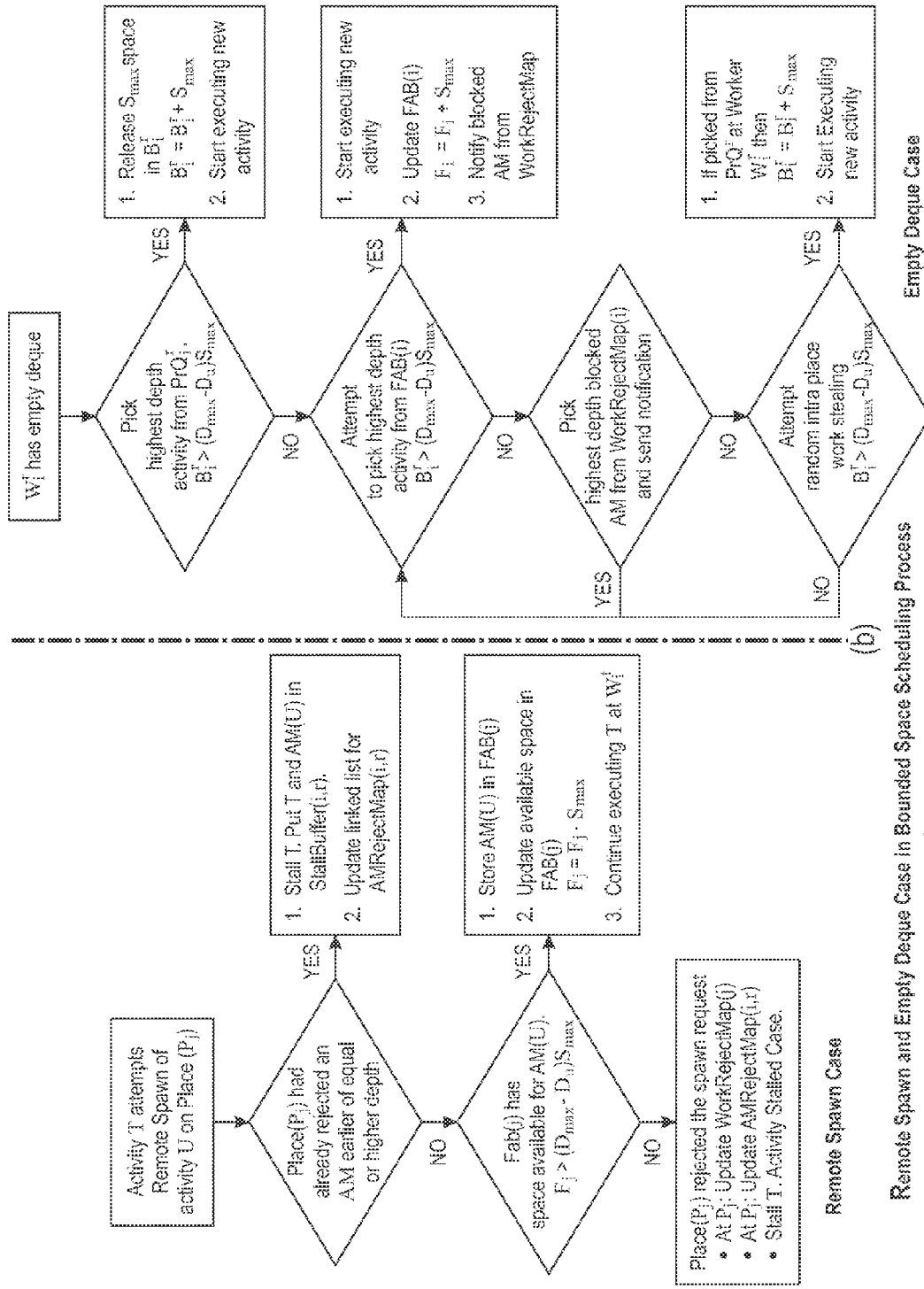

The distributed data structures for a bounded space process according to embodiments of the invention are given in FIG. 4. FIG. 5 (A-B) illustrates distributed data structures for bounded space scheduling and Remote Spawn and Empty Deque cases according to an embodiment of the invention.

Let AMRejectMap(i,r), PrQ(i,r) and StallBuffer(i,r) denote the AMRejectMap, PrQ and StallBuffer, respectively for worker $W_i^r$ at place $P_i$. Let $B_i^r$ denote the combined space for the PrQ(i,r) and StallBuffer(i,r). Let FAB(i) and WorkRejectMap(i) denote the FAB and WorkRejectMap, respectively at place $P_i$. Let $F_i$ denote the current space available in FAB(i). Let AM(T) denote the active message for spawning the activity T. The activities in remote-stalled state are tracked using a linked list using activity IDs with the head and tail of the list available at the tuple corresponding to the place in map AMRejectMap.

Computation starts with root (depth 1) of the computation DAG at a worker $W_0^s$, at the default place $P_0$. At any point of time a worker at a place, $W_i^r$, can either be executing an activity, T, or be idle. The detailed process is presented in FIG. 6. Some cases of the process are described here. When T needs to attempt a remote spawn (Remote Spawn case, refer FIG. 5(B)) at place $P_j$, it first checks if there are already stalled activities in AMRejectMap(i,r). If there is already a stalled activity, then T is added to the StallBuffer(i,r) and the link from the current tail in the tuple corresponding to $P_j$, in AMRejectMap(i,r) is set to T. Also, the tail of the tuple is set to T.

If there is no stalled activity in AMRejectMap(i,r) for place $P_j$, then the worker attempts a remote spawn at place $P_j$. At $P_j$, check is performed by the dedicated processor for space availability in the FAB(j). If it has enough space then the active message, AM(U), is stored in the remote FAB(j), the available space in FAB(j) is updated and T continues execution. If there is not enough space then AMRejectMap(i,r) is updated accordingly and T is put in the StallBuffer(i,r).

When the worker $W_i^r$ receives notification (Receives Notification case) of available space from place $P_j$, then it gets the tuple for $P_j$ from AMRejectMap(i,r) and sends the active message and the head activity to $P_j$. At $P_j$, the WorkRejectMap (j) is updated. Also, $W_i^r$ updates the tuple for $P_j$ by updating the links for the linked list in that tuple. The remote-stalled activity is enabled and put in PrQ(i,r) (Activity Enabled case).

Space Bound and Deadlock Freedom Proof

Herein are stated the lemmas and sketch of the proof of the theorems (refer to Appendix C.2 for details). Since herein is considered stack space for execution in the space constraint, the depth of activity in the computation tree is used in the lemmas/proofs below. An activity at depth d requires less than $((D_{max}-d)*S_{max})$ amount of stack space for execution since it can generate a maximum of $(D_{max}-d)$ stalled activities along one execution path and each stack frame is bounded by $S_{max}$ bytes. During the process, this stack space $(((D_{max}-d)*S_{max}))$ is checked before picking the activity for execution (Empty Deque Case) or placing a remote active message in the FAB (Remote Spawn case). $S_{max}$ space is reserved in the FAB when that active message is accepted and $S_{max}$ space is released from the FAB when that active message is picked up by an idle worker for execution. $S_{max}$ space is taken away from $B_i^r$ when an activity gets stalled (Activity Stalled case), while $S_{max}$ is added to $B_i^r$ when that activity is picked up for execution (Empty Deque case).

Lemma 1 A place or a worker that accepts activity with depth d' has space to execute activities of depth greater than or equal to d'+1.

Lemma 2 There is always space to execute activities at depth $D_{max}$.

Lemma 3 At any point of time (before termination of complete computation tree execution) at least one path in the computation tree is guaranteed to execute.

Proof Herein is used the depth based ordering property (valid during scheduling). Let the max depth activity that a place $P_1$ is executing be $d_1$. Then the place is guaranteed to execute/accept an activity of $d_2$ depth such that $d_2 > d_1$ by Lemma 1. Therefore, this activity of depth $d_1$ if it wants to create a child locally (Local Spawn case) can do so without any trouble (lemma holds true). Else, suppose that it wants to create child at remote place $P_2$ and that place rejects (Remote Spawn and Activity Stalled case). Now, there are two cases. In the first case, $P_2$ has an active executing path, possibly not having reached depth $d_1$, but that is not stalled (lemma holds true). In the second case, $P_2$ is either executing an activity (at a worker at that place) of depth at least $d_1+1$ (lemma holds true) or has such an activity in stalled state. If this stalled state is depth-stalled state then an activity of depth even higher depth is executing at this or another place (lemma holds true). If this stalled state is local-stalled state, then there must be another activity of higher depth executing at that worker (lemma holds true). However, if the stalled state is remote-stalled state then the same argument is applied to the remote place on which this activity is waiting and it can bee seen a monotonically increasing depth of activities in this resource dependency chain. Following this chain eventually will be hit an executing path due to cases discussed here or a leaf is reached in the computation tree which can execute without dependencies (lemma 2). Hence, it can be seen that there exists a path across places that belongs to the computation tree such that it is actively executing. Hence, at each instant of time there exists a path that is guaranteed to execute in the system. In fact, there can be multiple paths that are executing at any instant of time and this depends on the available space in the system and the computation tree.

Theorem 1 (Assured Leaf Execution) The scheduling maintains assured leaf execution property during computation. Assured leaf execution ensures that each node in computation tree becomes a leaf and gets executed.

Proof: Proof is given herein by induction on depth of an activity in the computation tree.

Base case (depth of an activity is $D_{max}$):

By lemma 3, a path to a leaf is guaranteed. An activity at depth $D_{max}$ is always a leaf and has no dependencies on other activities. Thus, an activity that occurs at $D_{max}$ will always get executed (by lemma 2).

Induction Hypothesis: Assume that all activities at depth d and higher are assured to become leaves and get executed.

Induction Step: It needs to be shown that all activities of depth d−1 are assured to become leaves and get executed. By induction hypothesis, the activities of depth d and higher have terminated. As in the Termination case, if there are remaining activities in the Deque then (they are at depth (d−1)) they become leaves and are picked up for execution. Otherwise, if the Deque becomes empty (Empty Deque case), the highest depth activities are picked for execution both from the PrQ and the FAB. Therefore, the activities at depth (d−1) start execution. Further, the dependencies in the computation tree are from descendants to ancestors (terminally-strict computation). Therefore, when activities of the depth d or higher finish execution, the activities at depth (d−1), in depend-stalled or remote-stalled state, definitely become leaves and get enabled. Hence, they are put into the PrQ at the respective workers (Activity Enabled case). If the activity, at depth (d−1), was in remote-stalled state, the blocked active message is sent to the remote place (Receives Notification case) for the spawn of child activity at depth d. By induction hypothesis, all activities at depth d have terminated so this has already happened earlier. Upon termination of d depth activity, assume the Deque is not empty and there are activities in PrQ of depth (d−1). These activities wait until the current executing path in the Deque terminates. Then, these activities which have become leaves get picked up for execution (since they have the highest depth and have the highest priority in the PrQ). Hence, all activities at depth (d−1) are also guaranteed to become leaves and get executed.

Theorem 2. A terminally strict computation scheduled using process in FIG. 6 takes $O(m \cdot (D_{max} \cdot S_{max} + n \cdot S_{max} + S_1))$ bytes as space per place.

Proof Sketch: The PrQ, StallBuffer, AMRejectMap and deque per worker (processor) take total of $O(m \cdot (D_{max} \cdot S_{max} + n \cdot S_{max} + S_1))$ bytes per place. The WorkRejectMap and FAB take total $O(m \cdot n + D_{max})$ and $O(D_{max} \cdot S_{max})$ space per place (discussed previously herein). The scheduling strategy adopts a space conservation policy to ensure deadlock free execution in bounded space. The basic aim of this strategy is to ensure that only as much breadth of a tree is explored as can be accommodated in the available space assuming each path can go to the maximum depth of $D_{max}$.

It starts with the initial condition where available space is at least $D_{max} \cdot S_{max}$ per worker per place. It is ensured that any activity that gets scheduled on a worker does not exceed the available space in the PrQ and StallBuffer at that worker. This will hold because only the activities in the Deque can be stalled and check was made that enough space for maximum number of stalled activities is available before execution. For more details, refer to Appendix C.2.

Time and Message Complexity Analysis

Herein is presented an overview of the time and message complexity analysis for both the unconstrained and bounded space distributed scheduling processes. Refer to Appendix (A and B) for details. The analysis is based on the number of throws by workers during execution. Each throw represents an attempt by a worker (processor that has no work) to steal an activity from either another worker (victim) or FAB at the same place.

Lemma 2.1. Consider a strict place-annotated computation DAG with work per place, $T_1^k$, being executed by the unconstrained space scheduling process (FIG. 3). Then, the execution (finish) time for place, k, is $O(T_1^k/m + Q_r^k/m + Q_e^k/m)$, where $Q_r^k$ denotes the number of throws when there is at least one ready node at place k and $Q_e^k$ denotes the number of throws when there are no ready nodes at place k The lower bound on the execution time of the full computation is $O(\max_k (T_1^k/m + Q_r^k/m))$ and the upper bound is $O(\Sigma_k (T_1^k/m + Q_r^k/m))$.

Proof Sketch: (Token based counting argument) Consider three buckets at each place in which tokens are placed: work bucket where a token is placed when a worker at the place executes a node of the computation DAG; ready-node-throw bucket where a token is placed when a worker attempts to steal and there is at least one ready node at the place; null-node-throw bucket where a token is placed when a worker attempts to steal and there are no ready nodes at the place (models wait time when there is no work at a place). The total finish time of a place can be computed by counting the tokens in these three buckets and by considering load balanced execution within a place using randomized work stealing. The upper and lower bounds on the execution time arise from the structure of the computation DAG and the structure of the online schedule generated (Appendix A).

Next, the bound on the number of tokens in the ready-node-throw bucket is computed using potential function based analysis. A unique contribution is in proving the lower and upper bounds of time complexity and message complexity for multi-place distributed scheduling algorithm presented in FIG. 3 that involves both intra-place work stealing and remote place affinity driven work pushing. For potential function based analysis, each ready node u is assigned a potential $3^{2w(u)-1}$ or $3^{2w(u)}$ depending upon whether it is assigned for execution or not ($w(u)=T_{\infty,n}-depth(u)$). All non-ready nodes have 0 potential. The total potential of the system at step i is denoted by $\phi_i$ and $\phi_i(D_i)$ denotes potential of all Deques that have some ready nodes. The key idea is to show that the potential $\phi_i$ monotonically decreases from $\phi_i(0)=3^{2T_{\infty,n}-1}$ (potential of the root node) to 0 (no ready node left) during the execution and this happens in a bounded number of steps.

Theorem 2.1 Consider a strict place-annotated computation w DAG with work per place k, denoted by $T_1^k$, being executed by the affinity driven multi place distributed scheduling process, FIG. 3. The lower bound on the expected execution time is $O(\max_k(T_1^k/m) + T_\infty^k))$ Moreover, for any $\epsilon > 0$, the lower bound on the execution time is $O(\max_k T_1^k/m + T_{\infty,n} + \log(1/\epsilon))$ with probability at least 1−ϵ. Similar probabilistic upper bound exists.

Proof Sketch: For the lower bound, the number of throws (when there is at least one ready node at a place) is analyzed by breaking the execution into phases. Each phase has $\theta(P=mn)$ throws ($O(m)$ throws per place). It can be shown that with constant probability, a phase causes the potential drop by a constant factor. More precisely, between phases i and i+1, $Pr\{(\phi_i - \phi_{i+1}) > \frac{1}{4}\}$ (details in Appendix B). Since the potential starts at $\phi_0 = 3^{2T_{\infty,n}-1}$ and ends at zero and takes integral values, the number of successful phases is at most $(2T_{\infty,n}-1) \log_{4/3} 3 < 8_{\infty,n}$. Thus, the expected number of throws per place gets bounded by $O(T_{\infty,n} \cdot m)$ and the number of throws is $O(T_{\infty,n} \cdot m) + \log(1/\epsilon))$ with probability at least 1−ϵ (using Chernoff Inequality). Using lemma 2.1 the lower bound on the expected execution time is $O(\max_k(T_1^k/m)+T_{\infty,n})$. The detailed proof and probabilistic bounds are presented in Appendix B.

For the upper bound, consider the execution of the sub-graph of the computation at each place. The number of throws in the ready-node-throw bucket per place can be similarly bounded by $O(T_\infty^k \cdot m)$. Further, the place that finishes the execution in the end, can end up with number of tokens in the null-node-throw bucket equal to the tokens in work and ready-node-throw buckets of all other places.

Hence, the finish time for this place, which is also the execution time of the full computation DAG is $O(\Sigma_k(T_1^k/m+T_\infty^k))$. The probabilistic upper bound can be similarly established using Chernoff Inequality.

Theorem 2.2. Consider the execution of a strict place-annotated computation DAG with critical path-length $T_{\infty,n}$ by the Affinity Driven Distributed Scheduling Process, (FIG. 3). Then, the total number of bytes communicated across places is $O(I(S_{max}+n_d))$ and the lower bound on the total number of bytes communicated within a place has the expectation $O(m \cdot T_{\infty,n} S_{max} \cdot n_d)$ where $n_d$ is the maximum number of dependence edges from the descendants to a parent, I is the number of remote spawns from one place to a remote place. Moreover, for any $\epsilon>0$, the probability is at least $1-\epsilon$ that the lower bound on the communication overhead per place is $O(m.n.(T_\infty+\log(1/\epsilon)).n_d.S_{max})$. Similarly message upper bounds exist.

The communication complexity for inter-place and intra-place communication can be derived by considering remote spawns during execution and throws for work stealing within places respectively. Detailed proof is given in Appendix C.

The bounded space scheduling process does constant work for handling rejected spawns but incurs additional $\log(D_{max})$ factor for FAB (concurrent priority queue) operations. Hence, the lower bound on the expected time complexity of the bounded space scheduling process is $O(\max_k(T_1^k/m) \cdot \log(D_{max})+T_{\infty,n})$. The analysis of the upper bound on time complexity involves modeling resource driven wait time and is not addressed herein. The inter-place message complexity is the same as theorem 2.2 as there is a constant amount of work for handling rejected remote spawns and notification of space availability.

To contrast the various exemplary embodiments of the invention that have been described herein with prior work, the following brief discussion is presented. Prior work extended a work stealing framework for terminally strict X10 computations and establishes deadlock free scheduling for SMP deployments. This work proved deadlock free execution with bounded resources on uni-processor cluster deployments while using Doppelganger mode of execution. However, this work neither considers work stealing in this framework, nor does it provide performance bounds. The Doppelganger mode of execution can lead to arbitrarily high costs in general. In contrast, embodiments of the invention consider affinity driven scheduling over an SMP cluster deployment using Active Message network. Further, embodiments of the invention include intra-place and inter-place work stealing and prove space and performance bounds with deadlock free guarantee.

Other prior work considered nested-parallel computations on multiprocessor HSMSs (hardware-controlled shared memory systems) and proved upper bounds on the number of cache-misses and execution time. It also presents a locality guided work stealing algorithm that leads to costly synchronization for each thread/activity. However, activities may not get executed at the processor for which they have affinity. In contrast, embodiments of the invention consider affinity driven scheduling in a multi-place setup and provide performance bounds under bounded space while guaranteeing deadlock free execution.

Still other prior work provided performance bounds of a non-blocking work stealing algorithm in a multi-programmed SMP environment, for general multi-threaded computations under various kernel schedules using potential function technique. This approach however does not consider locality guided scheduling. In contrast, embodiments of the invention consider affinity driven multi-place work stealing processes for applications running in dedicated mode (stand alone), with deadlock freedom guarantees under bounded resources and leverage the potential function technique for performance analysis.

Still further prior work introduced a work-dealing technique that attempts to achieve "locality oriented" load distribution on small-scale SMPs. It has a low overhead mechanism for dealing out work to processors in a global balanced way without costly compare-and-swap operations. Various embodiments of the invention assume that the programmer has provided place annotations in the program in a manner that leads to optimal performance considering load-balancing. According to embodiments of the invention, the activities with affinity for a place are guaranteed to execute on that place while guaranteeing deadlock freedom.

Still further work presented a space-efficient scheduling algorithm for shared memory machines that combines the low scheduling overheads and good locality of work stealing with the low space requirements of depth-first schedulers. For locality this work uses the heuristic of scheduling threads that are close in the computation DAG onto the same processor. Embodiments of the invention consider a multi-place setup and assume affinities in the place-annotate computation have been specified by the programmer.

Still further work studied two-level adaptive multi-processor scheduling in a multi-programmed environment. This work presented a randomized work-stealing thread scheduler for fork-join multithreaded jobs that provides continual parallelism feedback to the job scheduler in the form of requests for processors and uses trim analysis to obtain performance bounds. However, this work did not consider locality guided scheduling. Various embodiments of the invention assume a dedicated mode of execution but can be extended to multi-programmed modes also.

FIG. 13 presents an exemplary comparison between different scheduling approaches and those according to embodiments of the invention. Scheduling approaches according to embodiments of the invention are denoted DSA I (unconstrained space) and DSA II (bounded space). The notation used is as follows.

- Column, Scheduling Algorithm, has values: WS (Work Stealing), WD (Work Dealing), DFS (Depth First Search) and WP (Work Pushing).
- Column, Affinity Driven, has values: Y (Yes), N (No) and L (limited extent).
- Column, Nature Of Computation, has values: FS (fully-strict), G (general), NP (nested parallel), IDP (iterative data parallel) and TS (terminally strict).
- Column, MP vs SP, denotes multi-place (MP) or single place (SP) algorithm setup.
- Column, DM vs MPM, denotes dedicated mode (DM) or multi-programmed mode (MPM) environment.
- Column, Sync. Overheads, has values L (low), M (medium) and H (high).
- Column, DG mode, denotes whether Doppelganger mode is used in multi-place setup.

Column, IAP vs. Both, denotes whether intra-place stealing (IAP) is only supported or both(Both) inter-place and intra-place stealing are supported.

The last Column denotes whether deadlock freedom, space bound and time bound are presented in the respective scheduling approaches.

Anyplace Activity

The run-time system needs to provide online distributed scheduling of large hybrid parallel computations on many-core and massively parallel architectures. Activities (threads) that have pre-specified placement are referred to herein as affinity annotated activities. Further, there are activities (threads) in the parallel program that can be run on any place. Such activities are referred to as anyplace activities. Parallel computations that have both affinity annotated activities and anyplace activities are referred to as hybrid parallel computations.

Herein, anyplace activities are allowed in the input hybrid computation DAG. This generalization allows more parallel applications to be expressed easily by the programmer. Also, herein is presented are novel distributed scheduling processes that incorporate inter-place prioritized random work stealing to provide automatic dynamic load balancing across places. It is proved that with suitable choice of probability distribution, the prioritized random work stealing across places is efficient. Further, it leads to low average communication cost when the distances between the places are different (e.g. 3D torus interconnect). An embodiment of the invention leverages the distributed deadlock avoidance strategy for deadlock free execution and time and message complexity proofs in prior work for efficient scheduling of hybrid parallel computations. Some key aspects of various embodiments of the invention include the following.

First, an online multi-place distributed scheduling algorithm for strict multiplace hybrid parallel computations assuming unconstrained (sufficient) space per place is given. This process incorporates (a) intra-place work stealing, (b) remote place work pushing for affinity annotated activities and (c) prioritized random work stealing across places for anyplace activities. It is shown herein that prioritized random stealing across places is efficient. Also presented herein are the time and message complexity bounds of the scheduling algorithm.

Second, for bounded space per place, a novel distributed scheduling process for terminally strict multi-place hybrid computations with provable physical deadlock free execution is presented.

Figure 7:
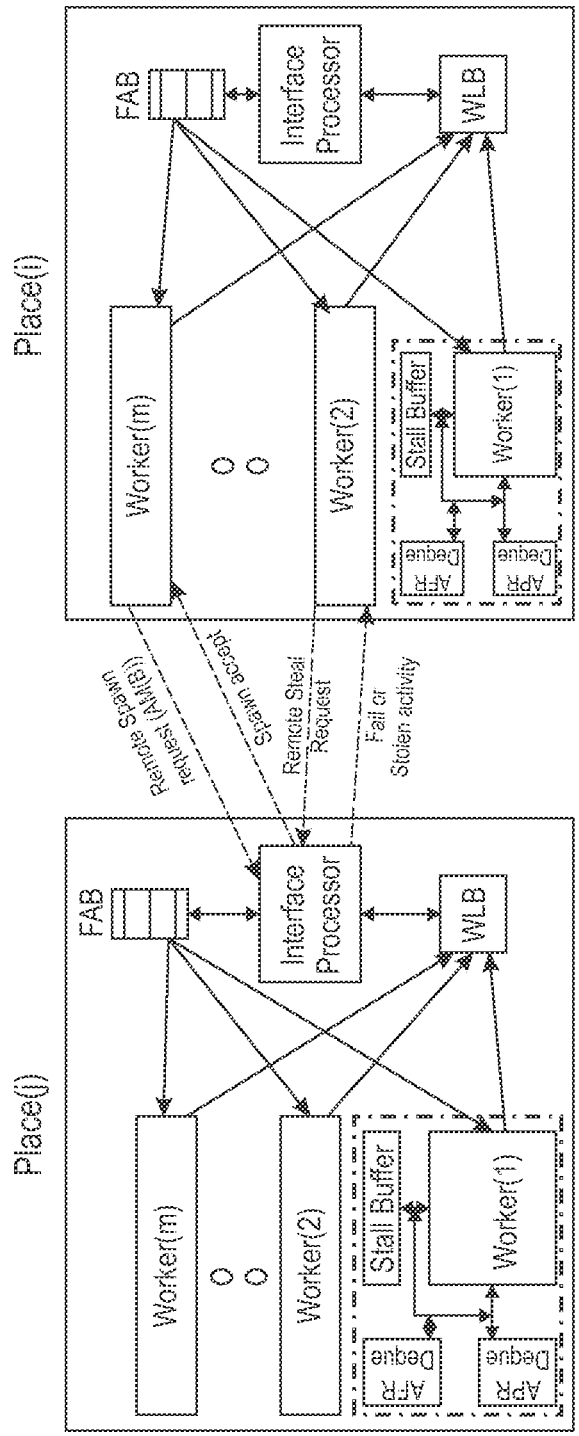
FIG. 7 illustrates a hybrid distributed scheduling according to embodiments of the invention.

Process Design: Each place maintains one Fresh Activity Buffer (FAB) which is managed by the interface processor at that place. An activity that has affinity for a remote place is pushed into the FAB at that place. Each worker at a place has: (a) an APR Deque that contains anyplace ready activities, (b) an AFR Deque that contains affinity annotated ready activities and (c) Stall Buffer that contains stalled activities (refer FIG. 7(B)). The FAB at each place as well as the AFR Deque and APR Deque at each worker are implemented using concurrent deque data-structure. Each place also maintains a Worker List Buffer (WLB) that is a list of workers that have anyplace activities ready to be stolen. WLB is implemented as a concurrent linked list and is maintained by the interface processor. WLB aids in remote stealing where the remote workers which attempt to steal activities from this place get information about available workers for stealing from WLB. The distributed scheduling algorithm is given in FIG. 8.

Time Complexity Analysis: The detailed time complexity analysis using potential function on ready nodes in the system follows as in prior works. Herein a brief intuitive explanation of time and message complexity is given. Contributions unique to embodiments of the invention are (a) proof that prioritized random inter-place work stealing is efficient using suitable probability density function, (b) proof of the lower and upper bounds of time complexity and message complexity for the multi-place distributed scheduling algorithm presented herein that includes (1) intra-place work stealing, (2) remote-place work stealing and (3) remote place affinity driven work pushing.

Below, throw represents an attempt by a worker (processor that has no work) to steal an activity. It can be an intra place throw when the activity is stolen from another local worker (victim), or remote place throw when it is stolen from a remote place. For potential function based analysis, each ready node u is assigned a potential $3^{2w(u)-1}$ or $3^{2w(u)}$ depending on whether it is assigned for execution or not ($w(u)=T_{\infty,n}-\text{depth}(u)$). The total potential of the system at step i is denoted by $\phi^i$ and $\phi_i(D_i)$ denotes potential of all APR Deques and AFR Deques that have some ready nodes.

Figure 9:
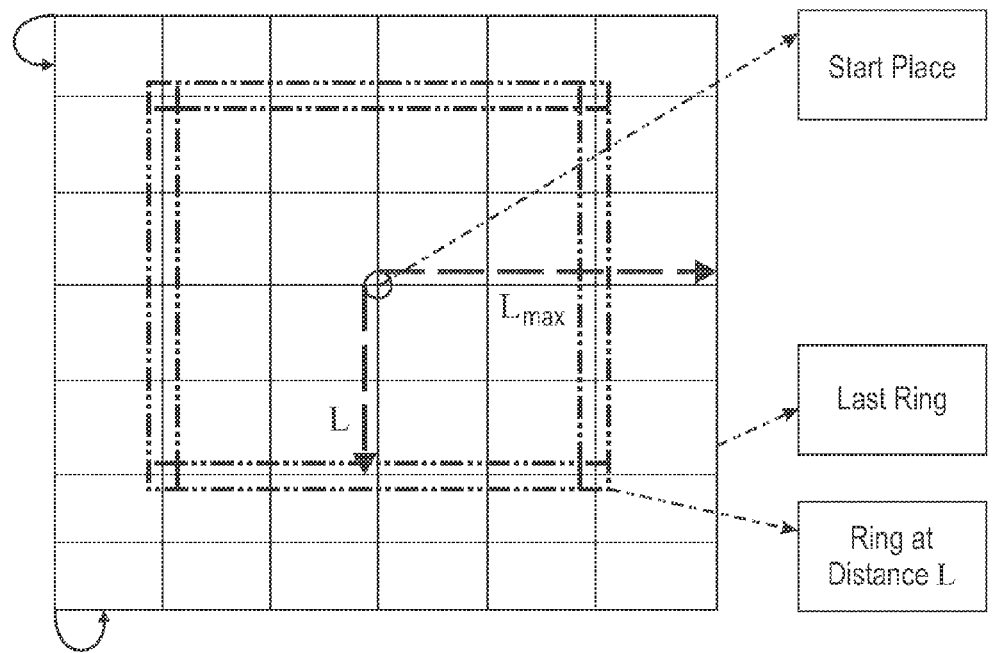
FIG. 9 illustrates 2D Torus with rings of places according to an embodiment of the invention.

Prioritized Random Inter-Place Work Stealing. Herein it is proven that distance-prioritized inter-place work stealing works efficiently with suitable choice of probability distribution across places. Consider a 2D torus interconnect across places. Let the place where a processor attempts to steal be denoted by the start place. The places around the start place can be viewed as rings. The rings increase in size as one moves to rings at increasing distance from the start place, i.e. there are more places in a ring farther away from the start place than the ring closer to the start place. (refer FIG. 9). In a remote steal attempt from the start place, the places on the same ring are chosen with equal probability.

This probability decreases with increasing ring distance from the start place but the total probability of choosing a processor over all processors across all places should be equal to 1. In order to model this scenario, consider a generalized Balls and Weighted Bins game where P balls are thrown independently but non-uniformly at random into P bins. An upper bound is derived on the probability of the un-successful steal attempts using Markov's inequality.

Lemma 3.1. Prioritized Balls and Weighted Bins Game: Let there be n places arranged in a 2D torus topology. Suppose that at least P balls are thrown independently but non-uniformly at random into P bins, where i=1, . . . P, bin i has weight $W_i$. The total weight $W=\Sigma_{1\leq i\leq P}W_i$. For each bin i, define a random variable X(i) as, $X(i)=W_i$, if some ball lands in bin $i$ $X(i)=0$, otherwise Let $l_{max}$ be the distance of the start place from the last ring. Define the probability distribution of choosing rings as follows. Let $\gamma/l_{max}$ be the probability of choosing the last ring at distance $l_{max}$ from the source of the steal request, where $0<\gamma<1$. The probability of selecting other rings is chosen appropriately so that the sum of choosing processor across all processors equals 1. (For example, let $\gamma=\frac{3}{4}$. Here, there is assigned a probability of $5/4l_{max}$ to each of the first $l_{max}/2$ rings and probability of $3/4l_{max}$ to each of the last $l_{max}/2$ rings.)

If $X=\Sigma_{1\leq i\leq P}X(i)$, then for $\beta$ in the range of $0<\beta<1$, thus:

$$\Pr X \geq \beta \cdot W > 1-1/((1-\beta)e^{\gamma/2}).$$

Proof A ring at distance l from the start place has $8^l$ places. Since each place has m processors, the ring at distance l has $8^l$ m processors and each of the processors have equal probability that a ball will and in that processor (bin).

Now, for each bin i, consider the random variable, W(i)–X(i). It takes on a value W(i) when no ball lands on bin (i) otherwise is taken value 0. Thus:

$E[W(i)-X(i)] = W(i) *$ probability that no ball lands in bin(i)

$\leq W(i) * [1-\text{Min.prob. that any ball lands in bin}(i)]^P$ $\leq W(i) * [1-\gamma/l_{max} \cdot 8 l_{max} m0]^{mn}$ $\leq W(i)/e^{(l_{mn}+1)} \cdot \gamma/(2 \cdot l_{max})$ $\therefore n = 4 l_{max}(l_{max}+1); (1-1/x)^x \leq 1/e$ $\leq W(i)/e^{(\gamma/2)}$, for lrg $l_{max}$ It follows that: $E[W-X] \leq W e^{r/2}$
From Markov's inequality thus:

$Pr\{(W-X) > (1-\beta)W\} < E[W-X]/((1-\beta) \cdot W)$ $\Rightarrow Pr\{(X < \beta \cdot W\} \leq 1/((1-\beta) \cdot e^{\gamma/2})$ $\Rightarrow Pr\{(X \geq \beta \cdot W\} > 1 - 1/((1-\beta) e^{\gamma/2})$ It can be seen that due to skewed probability of balls choosing which bin to go, the probability of successful attempts goes down compared to the case of uniform probability. Even though a ring distance was chosen based probability variation, actual processor distance based probability variation can be similarly analyzed with suitable probability distribution. By choosing β=⅕,γ=¾ one can show that after O(mn) remote place throws across the system, the potential of anyplace ready activities in $\phi_i(D_i)$ decreases by ¹⁄₁₆. The time and message complexity lower and upper bounds are given by theorems below. Detailed proofs follow by extending the analysis in prior work.

Theorem 3.1. Consider a strict multi-place hybrid computation DAG with work for place $P_k$, denoted by $T_1^k$, being executed by the distributed scheduling process (discussed above). Let the critical-path length for the computation be $T_{\infty,n}$. The lower bound on the expected execution time is $O(\max_k T_1^k/m + T_{\infty,n})$ and the upper bound is $O(\Sigma_k(T_1^k/m + T_\infty^k))$. Moreover, for any ε>0, the lower bound for the execution time is $O(\max_k T_1^k/m + T_{\infty,n} + \log(1/\epsilon))$ with probability at least 1–ε. Similar probabilistic upper bound exists.

Theorem 3.2. Consider the execution of a strict hybrid multi-place computation DAG with critical path-length $T_{\infty,n}$ by the Distributed Scheduling Algorithm (discussed herein). Then, the total number of bytes communicated across places has the expectation $O(I \cdot S_{max} \cdot n_d) + m \cdot T_{\infty,n} \cdot S_{max} \cdot n_d)$. Further, the lower bound on number of bytes communicated within a place has the expectation $O(m \cdot T_{\infty,n} \cdot S_{max} \cdot n_d)$, where $n_d$ is the maximum number of dependence edges from the descendants to a parent and I is the number of remote spawns from one place to a remote place. Moreover, for any ε>0, the probability is at least (1–ε) that the lower bound on the intra-place communication overhead per place is $O(m \cdot (T_{\infty,n} + \log(1/\epsilon)) \cdot n_d \cdot S_{max})$. Similarly message upper bounds exist.

Distributed Scheduling of Hybrid Computation in Bounded Space: Due to limited space on real systems, the distributed scheduling algorithm has to limit online breadth first expansion of the computation DAG while minimizing the impact on execution time and simultaneously providing deadlock freedom guarantee. Due to bounded space constraints this distributed online scheduling algorithm has guaranteed deadlock free execution for terminally strict multi-place hybrid computations. Due to space constraints at each place in the system, the algorithm needs to keep track of space availability at each worker and place to ensure physical deadlock freedom. It does so by ensuring that remote activity pushing, inter-place stealing and intra-place stealing happen only when there is sufficient space to execute the remaining path to the leaf in the current path. This tracking of available space and using depth based ordering of activities for execution from FAB help in ensuring distributed deadlock avoidance. An activity can be in one of the following stalled states: (a) local-stalled due to lack of space at a worker, (b) remote-stalled due to failed spawn onto a remote place, (c) depend-stalled due to synchronization dependencies.

Herein it is assumed that maximum depth of the computation tree (in term's of number of activities), $D_{max}$, can be estimated fairly accurately prior to the execution from the parameters used in the input parallel computation. $D_{max}$ value is used in the distributed scheduling algorithm to ensure physical deadlock free execution. The assumption on knowledge of $D_{max}$ prior to execution holds true for the kernels and large applications of the Java Grande Benchmark suite.

Figure 11:
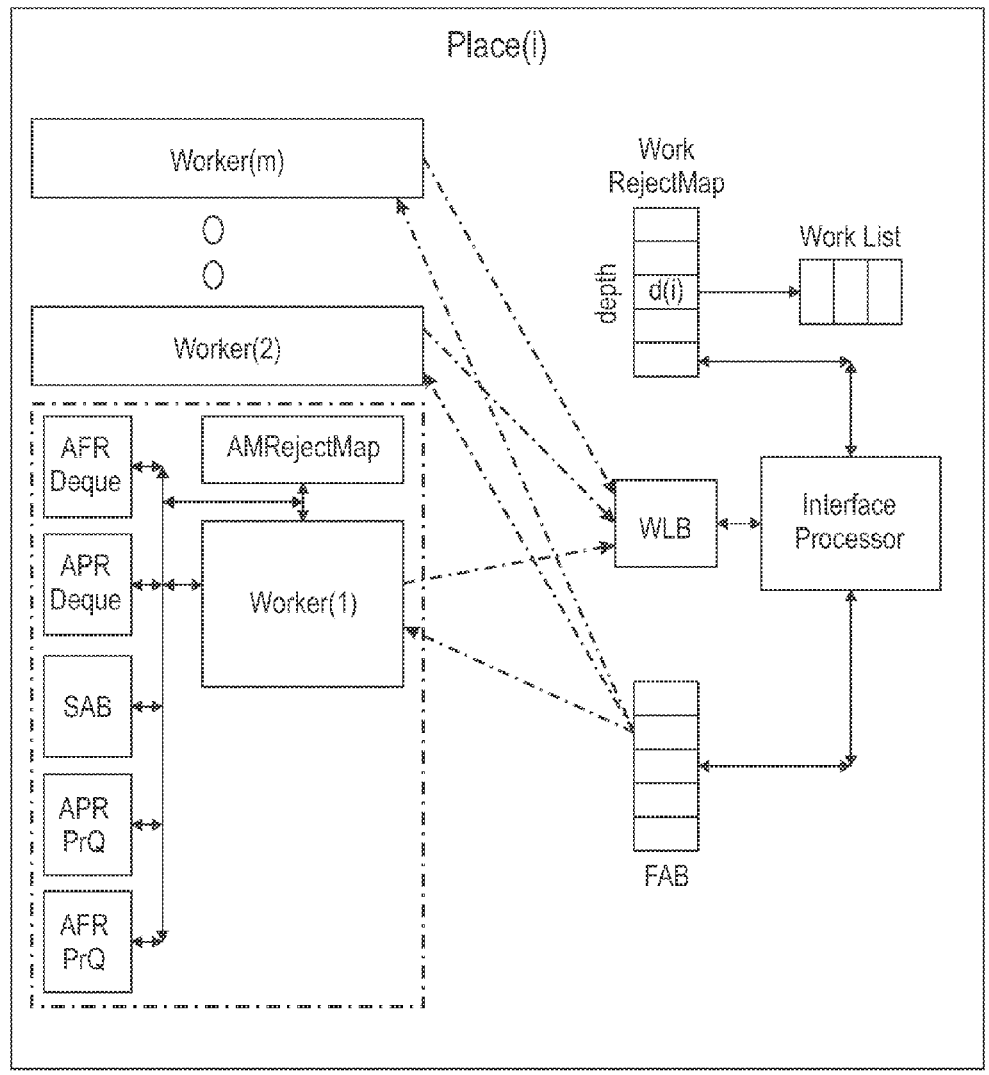
FIG. 11 illustrates distributed data structures for bounded space scheduling according to an embodiment of the invention.

Distributed Data-Structures & Process Design: The data structures used for bounded space scheduling algorithm are described in FIG. 10. FIG. 11 illustrates distributed data structures for bounded space scheduling according to an embodiment of the invention.

Let AM(T) denote the active message for spawning the activity T. The activities in remote-stalled state are tracked using a linked list using activity IDs with the head and tail of the list available at the tuple corresponding to the place in the map AMRejectMap. For notation purpose, the suffix (i) and (i, r) denote that data-structure is located at place $P_i$ and worker $W_i^r$ respectively.

Computation starts with root of the computation DAG which is at depth 1. The computation starts at a worker $W_0^s$, at the default place $P_0$. At any point of time a worker at a place, $W_i^r$, can either be executing an activity, T, or be idle. The detailed process is presented in FIG. 12. The actions taken by the interface processor have been kept implicit in the description for sake of brevity.

Distributed deadlock freedom can be proved by induction as in affinity driven scheduling and has been left for brevity. The essence lies in showing that when an activity gets rejected then a higher depth activity must be executing at that place and then using induction one can show that all activities eventually become leaf and get executed starting from maximum depth activities and going backwards to lower depth activities as the space gets released by completed activities. The following theorem gives the space bound.

Theorem 3.3 A terminally strict computation scheduled using algorithm in FIG. 12 uses $O(m \cdot (D_{max} \cdot S_{max} + n \cdot S_{max} + S_1))$ bytes as space per place.

The inter-place message complexity is same as theorem2.2 (assuming similar order of number of throws for inter-place work stealing) as there is constant amount of work for handling rejected remote spawns and notification of space availability. For intra-place work stealing again the message complexity is same as theorem 2.2.

Multi-Programmed Mode

Embodiments of the invention provide a multi-programmed mode using an adaptive work stealing framework. Here there are multiple jobs in the system (with multiple places). The framework is adaptive because the kernel scheduler changes the resources available to a job based on its utilization. If its utilization is high it might allocate more available resources and if its utilization is low then it might take away resources from that job. Given a set of resources from kernel scheduler (resources meaning processors/memory) the user scheduler runs the bounded space affinity driven distributed scheduling algorithm. Embodiments of the invention provide feedback to the kernel scheduler on the online demand for processors per place and memory per place. There can be minimum requirement of processors/cores and memory by each job. The kernel scheduler will guarantee that such resources are always available to that job. This is based on minimum performance requirements expected for that job. There are two schedulers here. One is a user level scheduler that gets the resources from the kernel scheduler. At regular intervals it informs the kernel scheduler whether the resources provided have been over-utilized or under utilized. The other is the kernel level scheduler that provides resources to multiple jobs based on their resource utilization. Here the resources include both processors/cores and memory.

Embodiments of the invention may be implemented in one or more computing devices configured appropriately to execute program instructions consistent with the functionality of the embodiments of the invention as described herein. In this regard, FIG. 14 describes a non-limiting example of such a computing device.

Figure 14:
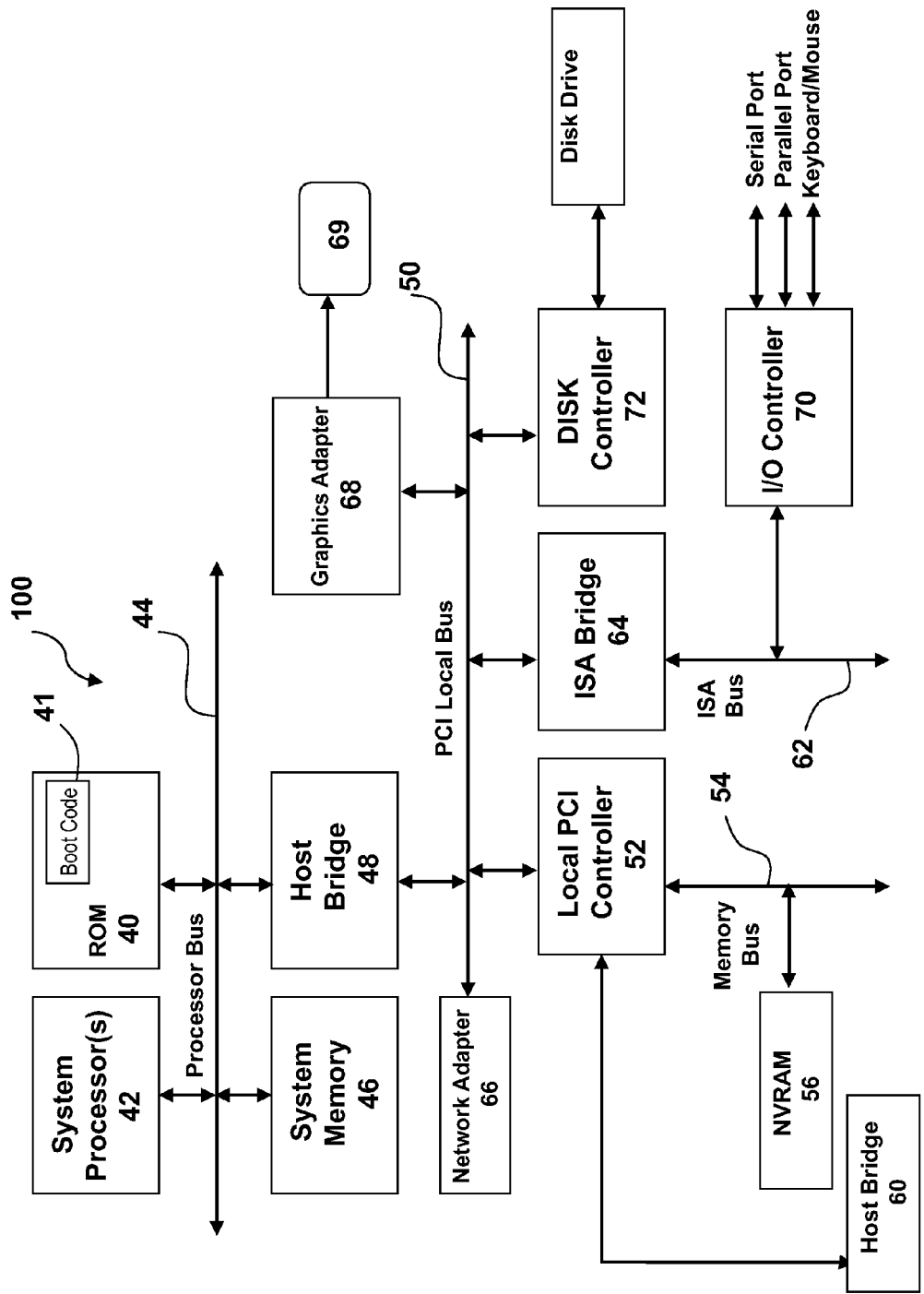
FIG. 14 illustrates an exemplary computer system according to one embodiment of the invention.

Referring now to FIG. 14, there is depicted a block diagram of an illustrative embodiment of a computer system 100. The illustrative embodiment depicted in FIG. 14 may be an electronic device such as a desktop computer or workstation computer. As is apparent from the description, however, the embodiments of the invention may be implemented in any appropriately configured device, as described herein.

As shown in FIG. 14, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

APPENDIX

A Affinity Driven Scheduling with Unconstrained Space

Lemma A. 1 Consider a strict place-annotated computation DAG with work per place, $T_1^k$, being executed by the affinity driven distributed scheduling algorithm presented in FIG. 3. Then, the execution (finish) time for place,k, is $O(T_1^k/m+Q_r^k/m+Q_e^k/m)$, where $Q_r^k$, denotes the number of throws when there is at least one ready node at place k and $Q_e^k$ denotes the number of throws when there are no ready nodes at place k. The lower bound on the execution time of the full computation is $O(\max_k(T_1^k/m+Q_r^k))$ and the upper bound is $O(\Sigma_k(T_1^k/m+T_\infty^k))$.

Proof At any place, k, we collect tokens in three buckets: work bucket, ready-node-throw bucket and null-node-throw bucket. In the work bucket the tokens get collected when the processors at the place it execute the ready nodes. Thus, the total number of tokens collected in the work bucket is $T_1^k$. When, the place has some ready nodes and a processor at that place throws or attempts to steal ready nodes from the PrQ or another processor's deque then the tokens are added to the read-node-throw bucket. If there are no ready nodes at the place then the throws by processors at that place are accounted for by placing tokens in the null-node-throw bucket. The tokens collected in these three buckets account for all work done by the processors at the place till the finish time for the computation at that place. Thus, the finish time at the place k, is $O(T_1^k/m+Q_r^k/m+Q_e^k/m)$. The finish time of the complete computation DAG is the maximum finish time over all places. So, the execution time for the computation is $\max_k O(T_1^k/m+Q_r^k/m+Q_e^k/m)$. We consider two extreme scenarios for $Q_e^k$ that define the lower and upper bounds. For the lower bound, at any step of the execution, every place has some ready node, so there are no tokens placed in the null-node-throw bucket at any place. Hence, the execution time per place is $O(T_1^k/m+Q_r^k/m)$. The execution time for the full computation becomes $O(\max_k(T_1^k/m+Q_r^k/m))$. For the upper bounds, there exists a place, say (w.l.o.g.) s, where the number of tokens in the null-node-throw buckets, $Q_e^s$, is equal to the sum of the total number of tokens in the work buckets of all other places and the tokens in the read-node-throw bucket over all other places. Thus, the finish time for this place, $T_f^s$, which is also the execution time for the computation is given by:

$$T_f^s = O\left(\sum_{1 \le k \le n} (T_1^k/m + Q_r^k/m)\right) \qquad (A.1)$$

B Time Complexity Analysis: Scheduling Algorithm with Unconstrained Space

We compute the bound on the number of tokens in the ready-node-throw bucket using potential function based analysis. Nirma S. Arora, Robert D. Blumofe, and C. Greg Plaxton. Threadscheduling for multiprogrammed multiprocessors. In SPAA, pages 119-129, Puerto Vallarta Mexico, 1998.

Let there be a non-negative potential with ready nodes (each representing one instruction) in a computation dag. During the execution using the affinity driven distributed scheduling algorithm (FIG.3), the weight of a node u in the enabling tree, w(u) is defined as $(T\infty, n - depth(u))$, where depth(u), is the depth of u in the enabling tree of the computation. For a ready node, u, we define $\phi_i(u)$, the potential of u at timestep i, as:

$$\phi_i(u) = 32w(u) - 1, \text{ if } u \text{ is assigned;} \qquad (B.1a)$$

All non-ready nodes have 0 potential. The potential at step i, $\phi_i$, is the SUM of the potential of each ready node at step i. When an execution begins, the only ready node is the root node with potential, $\phi(0) = 32T\infty, n^{-1}$. At the end the potential is 0 since there are no ready nodes. Let $F_i$ denote the set of processes whose deque is empty at the beginning of step i, and let $D_i$ denote the set of all other processes with non-empty deque. Let, $F_i$ denote the set of all ready nodes present in the FABs of all places. The total potential can be partitioned into three parts as follows:

$$\phi_i = \phi_i(E_i) + \phi_i(D_i) + \phi_i(F_i) \qquad (B.2)$$

where, $$\phi_i(E_i) = \sum_{q \in E_i} \phi_i(q) = \sum_{1 \le k \le n} \phi_i^k(E_i); \qquad (B.3a)$$

$$\phi_i(D_i) = \sum_{q \in D_i} \phi_i(q) = \sum_{1 \le k \le n} \phi_i^k(D_i); \qquad (B.3b)$$

$$\phi_i(F_i) = \sum_{q \in F_i} \phi_i(q) = \sum_{1 \le k \le n} \phi_i^k(F_i); \qquad (B.3c)$$

where, $\phi_i^k(\ )$ are respective potential components per place k. The potential at the place k, $\phi_i^k$, is equal to the sum of the three components, i.e.

$$\phi_i^k = \phi_i^k(E_i) + \phi_i^k(D_i) + \phi_i^k(F_i) \quad (B.4)$$

Actions such as assignment of a node from deque to the processor for execution, stealing nodes from the top of victim's deque and execution of a node, lead to decrease of potential (refer Lemma B.2). The idle processors at a place do work-stealing alternately between stealing from deque and stealing from the FAB. Thus, 2P throws in a round consist of P throws to other processor's deque and P throws to the FAB. We first analyze the case when randomized work-stealing takes place from another processor's deque using balls and bins game to compute the expected and probabilistic bound on the number of throws. For uniform and random throws in the bails and bins game it can be shown that one is able to get a constant fraction of the reward with, constant probability (refer Lemma B.3). The lemma below shows that whenever P or more throws occur for getting nodes from the top of the deques of other processors at the same place, the potential decreases by a constant fraction of $\phi_i(D_i)$ with a constant probability. For algorithm in FIG. 3, P=m (only intra-place work stealing).

Lemma B.1 Consider any round i and any later round s. such that at least P throws have taken place between round i (inclusive) and; round j (exclusive), then, $Pr\{(\phi_i - \phi_j) \geq 1/4 \cdot \phi_i (D_i)\} > 1/4$ There is an addtional component of potential decrease which is due to pushing of ready nodes onto remote FABs. Let the potential decrease due to this transfer be $\phi_{i \to j}^k(out)$. The new probabilistic bound becomes:

$$Pr\{(\phi_i - \phi_j) \geq 1/4 \cdot \phi_i(D_i) = \phi_{i \to j}(out)\} > 1/4 \quad (B.5)$$

The throws that occur on the FAB at a place can he divided into two cases. In the first case, let the FAR have at least P=m activities at the beginning of round i. Since, all m throws will be successful, we consider the tokens collected from such throws as work tokens and assign them to the work bucket of the respective processors. In the second case, in the beginning of round i, the FAB has less than m activities. Therefore, some of the m throws might be unsuccessful. Hence, from the perspective of place k, the potential $\phi_i^k(F_i)$ gets reduced to zero. The potential added at place k, in $\phi_j^k(F_j)$ is due to ready nodes pushed from the deque of other places. Let this component be $\phi_{i \to j}^k(in)$. The potential of the FAB at the beginning of round j is:

$$\phi_j^k(F_j) \to \phi_j^k(F_i) = \phi_{i \to j}^k(in). \quad (B.6)$$

Furthermore, at each place the potential also drops by a constant factor of $\phi_i^k(E_i)$. If a process q in the set $E_i^k$ does not have an assigned node, then $\phi_i(q)=0$. If q has an assigned node u, then $\phi_i(q) = \phi_i(u)$ and when node u gets executed in round i then the potential drops by at least $5/8 \cdot \phi_i(u)$. Adding over each process q in $E_i^k$, we get:

$$\{\phi_i^k(E_i) - \phi_j^k(E_j)\} \geq 5/8 \cdot \phi_i^k(E_i). \quad (B.7)$$

Lemma B.2 The potential function satisfies the following properties
1. When node u is assigned to a process at step i, then the potential decreases by at least $2/3 \phi_i(u)$.
2. When node u executes at step i, then the potential decreases by at least $5/8 \phi_i(u)$ at step i.
3. For any process, q in $D_i$, the topmost node u in the deque for q maintains the property that: $\phi_i(u) \geq 3/4 \phi_i(q)$
4. If the topmost node u of a processor q is stolen by processor p at step i, then the potential at the end of step i decreases by at least $1/2 \phi_i(q)$ due to assignment or execution of u.

Lemma B.3 Balls and Bins Game: Suppose that at least P balls are thrower independently and uniformly at random into P bins, where for i=1,2... P, bin i has weight $W_i$. The total weight $W = \Sigma_{1 \leq i \leq P} W_i$. For each bin i, define a random variable, $X_i$ as, $$X_i = W_i, \text{ if some ball lands in bin i} \quad (B.8a)$$

$$= 0, \text{ otherwise} \quad (B.8b)$$

If $X = \Sigma_{1 \leq i \leq P} X_i$, then for any β in the range 0<β<1, we have $Pr\{X \geq \beta \cdot W\} > 1 - 1/((1-\beta)e)$ Theorem B.4 Consider any place-annotated multi-threaded computation with total work $T_1$ and work per place denoted by $T_1^k$, being executed by the affinity driven multi-place distributed scheduling algorithm ??. Let the critical-path length for the computation be $T_\infty$. The lower bound on the expected execution time is $O(max_k T_1^k/m + T_{\infty,n})$ and the upper bound is $O(\Sigma_k(T_1^k/m + T_\infty^k))$. Moreover, for any e>0, the execution time is $O(max_k T_1^k/m + T_{\infty,n} + \log(1/e))$ with probability at least 1−e.

Proof Lemma A.1 provides the lower bound on the execution time in terms of number of throws. We shall prove that the expected number of throws per place is $O(T_\infty \cdot m)$, and that the number of throws per place is $O(T_\infty \cdot m + \log(1/e))$ with probability at least 1−e.

We analyze the number of ready-node-throws by breaking the execution into phases of θ(P=mn) throws (O(m) throws per place). We show that with constant probability, a phase causes the potential to drop by a constant factor, and since we know that the potential starts at $\phi_0 = 3^{2T_\infty} \cdot n^{-1}$ and ends at zero, we can use this fact to analyze the number of phases. The first phase begins at step $t_1=1$ and ends at the first step, $t'_1$, such that at least P throws occur during the interval of steps $[t_1, t'_1]$. The second phase begins at step $t_2 = t'_1 + 1$, and so on.

Combining equations (B.5), (B.6) and (B.7) over all places, the components of the potential at the places corresponding to $\phi_{i \to j}^k(out)$ and $\phi_{i \to j}^k(in)$ cancel out. Using this and Lemma B.1, we get that: $Pr\{(\phi_i - \phi_j) \geq 1/4 \cdot \phi_i\} > 1/4$.

We say that a phase is successful if it causes the potential to drop by at least a 1/4 fraction. A phase is successful with probability at least 1/4. Since the potential drops from $3^{2T_{\infty,n}-1}$ to 0 and takes integral values, the number of successful phases is at most $(2T_{\infty,n}-1)\log_{4/3} 3 < 8T_{\infty,n}$. The expected number of phases needed to obtain $8T_{\infty,n}$ successful phases is at most $32T_{\infty,n}$. Since each phase contains O(mn) ready-node throws, the expected number of ready-node-throws is $O(T_{\infty,n} \cdot m \cdot n)$ with $O(T_{\infty,n} \cdot m)$ throws per place. The high probability bound can be derived [4] using Chernoffs Inequality. We omit this for brevity.

Now, using Lemma A.1, we get that the lower bound on the expected execution time for the affinity driven multi-place distributed scheduling algorithm is $O(max_k T_1^k/m + T_{\infty,n})$.

For the upper bound, consider the execution of the sub-graph of the computation at each place. The number of throws in the ready-node-throw bucket per place can be similarly bounded by $O(T_\infty k \cdot m)$. Further, the place that finishes the execution in the end, can end up with number of tokens in the null-node-throw bucket equal to the tokens in work and read-node-throw buckets of other places. Hence, the finish time for this place, which is also the execution time of the full computation DAG is $O(\Sigma_k(T_1^k/m + T_\infty^k))$. The probabilistic upper bound can be similarly established using Chernoff bound.

C

C.1 Message Complexity of Distributed Scheduling Algorithm in Unconstrained Space Proof First consider inter-place messages. Let the number of affinity driven pushes to remote places be $O(I)$, each of $O(S_{max})$ bytes. Further, there could be at most $n_d$ dependencies from remote descendants to a parent, each of which involves communication of constant, $O(1)$, number of bytes. So, the total inter place communication is $O(I.(S_{max}+n_d))$. Since the randomized work stealing is within a place, the lower bound on the expected number of steal attempts per place is $O(m.T_\infty)$ with each steal attempt requiring $O(S_{max})$ bytes of communication within a place. Further, there can be communication when a child thread enables its parent and puts the parent into the child processors' deque. Since this can happen $n_d$ times for each time the parent is stolen, the communication involved is at most $(n_d \cdot S_{max})$. So, the expected total infra-place communication per place is $O(m \cdot T_{\infty,i} \cdot S_{max} \cdot n_d)$. The probabilistic bound can be derived using Chernoff's inequality and is omitted for brevity. Similarly, expected and probabilistic upper bounds can be established for communication complexity within the places.

C.2 Deadlock Freedom and Space Bound Proof For Distributed Scheduling Algorithm using Bounded Space Lemma C.1 A place or a worker that accepts activity with depth d' has space to execute activities of depth greater than or equal to d'+1.

Proof At any point of time, a place or a worker accepts an activity of depth d' only if it has space greater than $(D_{max}-d') \cdot S_{max}$. This holds true in the Remote Empty Deque and Activity Stalled cases of the algorithm (FIG. 6). The algorithm adopts this reservation policy which ensures that activities already executing have reserved space that they may need for stalled activities. The space required to execute an activity of depth greater or equal to (d'+1) is obviously less, and hence, the place can execute it.

Lemma C.2 There is always space to execute activities at depth $D_{max}$.

Proof The space required to execute activities at $D_{max}$ is at most $S_{max}$ because it is the leaf activity. Such activities do not depend on other activities and will not spawn any child activities so they will not generate any stalled activities. Hence, they require a maximum of $S_{max}$ amount of space. Therefore, leaf activities get consumed from the PrQ as soon as its worker gets idle. The leaf activities also get pulled from the FAB and get executed by the worker, that has empty deque and cannot execute activities from its PrQ due to lack of activities or space.

Theorem C.3 A terminally strict computation scheduled using algorithm in FIG. 6 uses $O(m \cdot (D_{max} \cdot S_{max} + n \cdot S_{max} + S_1))$ bytes as space per place.

Proof The PrQ, StallBuffer, AMRejectMap and deque per worker (processor) take total of $O(m \cdot (D_{max} \cdot S_{max} + n \cdot S_{max} + S_1))$ bytes per place. The WorkRejectMap and FAB take total $O(m \cdot n + D_{max})$ and $O(D_{max} \cdot S_{max})$ space per place (section 5.1). The scheduling strategy adopts a space conservation policy to ensure deadlock free execution in bounded space. The basic aim of this strategy is to ensure that only as much breadth of a tree is explored as can be accommodated in the available space assuming each path can go to the maximum depth of $D_{max}$. It starts with the initial condition where available space is at least $D_{max} \cdot S_{max}$ per worker per place. No activity (with depth $D_u$) can be scheduled on a worker if it cannot reserve the space for the possible stalled activities $(((D_{max}-D_u) \cdot S_{max}))$ that it can generate at that place (Remote Spawn, Empty Deque cases). A place that enables a remote activity stalled because of space does so only after ensuring that appropriate amount of space is present forte activity that shall be created (Activity Enabled and Receives Notification cases). Similarly, when a worker steals it will ensure that it has enough space $(((D_{max}-D_u) \cdot S_{max}))$ to accommodate the stalled activities that would get created as a result of execution of stolen activity, u (Empty Deque case). When an activity gets stalled (Activity Stalled case) it reserves $S_{max}$ space from $B_i^r$ and When it is picked up for execution (Empty Deque case) it release this space, $S_{max}$ from $B_i^r$. So, the space $B_i^r$ suffices during execution. Similarly, for the FAB, $S_{max}$ space is reserved when an active message is placed and $S_{max}$ space is release when that active message is picked for execution by an idle worker (Empty Deque case). Thus, the FAB space requirement does not exceed during execution. The check on the FAB space for remote spawn $((((D_{max}-D_u) \cdot S_{max}))$ ensures depth-based ordering of activities across places and hence helps in deadlock free execution. From the algorithm, it can be seen that every reservation and release is such that the total space requirement at a place does not exceed what was available initially. Hence, the total space per place used is $O(m \cdot (D_{max} \cdot S_{max} + n \cdot S_{max} + S_1))$.

What is claimed is:

1. An apparatus comprising:
   one or more processors; and
   a non-transitory computer readable storage medium having computer readable program code embodied therewith and executable by the one or more processors, the computer readable program code comprising:
   computer readable program code configured to provide distributed scheduling of activities for workers at one or more places, the one or more places each comprising one or more processors having shared memory;
   wherein to provide distributed scheduling further comprises permitting activities with higher depth on a path in a computation tree to execute to completion before activities with lower depth on the same path;
   wherein each worker at a place maintains a priority queue that accords higher priority to activities with higher depth, and a record of rejected attempts to spawn activities at another place;
   wherein each place maintains a fresh activity buffer containing activities spawned by remote places; and
   wherein each place maintains a list of workers whose spawned activities are rejected at that place.

2. The apparatus according to claim 1, wherein to provide distributed scheduling further comprises providing distributed scheduling for terminally strict multi-place computations.

3. The apparatus according to claim 1, wherein to provide distributed scheduling further comprises providing hierarchical scheduling, wherein the hierarchical scheduling involves scheduling within a place and across places.

4. The apparatus according to claim 1, wherein the computer readable program code further comprises computer readable program code configured to provide scheduling for hybrid parallel computations including anyplace activities and activities.

5. The apparatus according to claim 1, wherein the computer readable program code further comprises computer readable program code configured to provide anyplace activities in a parallel computation to enable automatic load-balancing across places.

6. The apparatus according to claim 1, wherein the computer readable program code further comprises computer readable program code configured to provide prioritized random work stealing across places where a probability of stealing activities from closer places is higher than a probability of stealing from farther places.

7. The apparatus according to claim 1, wherein the computer readable program code further comprises computer readable program code configured to provide space scheduling utilizing one or more of intra-place work stealing and remote work pushing for general computations.

8. The apparatus according to claim 1, wherein the computer readable program code further comprises computer readable program code configured to provide bounded space scheduling for terminally strict computations.

9. The apparatus according to claim 8, wherein the bounded space scheduling further comprises depth-based priority of activities/threads.

10. The apparatus according to claim 1, wherein the computer readable program code further comprises computer readable program code configured to provide a multi-program mode wherein a kernel scheduler changes resources available to a job based on utilization.

11. A method comprising:
utilizing one or more processors to execute a program of instructions tangibly embodied in a program storage device, the program of instructions comprising:
computer readable program code configured to provide distributed scheduling of activities for workers at one or more places, the one or more places each comprising one or more processors having shared memory;
wherein to provide distributed scheduling further comprises permitting activities with higher depth on a path in a computation tree to execute to completion before activities with lower depth on the same path;
wherein each worker at a place maintains a priority queue that accords higher priority to activities with higher depth, and a record of rejected attempts to spawn activities at another place;
wherein each place maintains a fresh activity buffer containing activities spawned by remote places; and
wherein each place maintains a list of workers whose spawned activities are rejected at that place.

12. The method according to claim 11, wherein to provide distributed scheduling further comprises providing distributed scheduling for terminally strict multi-place computations.

13. The method according to claim 11, wherein to provide distributed scheduling further comprises providing hierarchical scheduling, wherein the hierarchical scheduling involves scheduling within a place and across places.

14. The method according to claim 11, wherein the program of instructions further comprises computer readable program code configured to provide scheduling for hybrid parallel computations including anyplace activities and activities.

15. The method according to claim 11, wherein the program of instructions further comprises computer readable program code configured to provide anyplace activities in a parallel computation to enable automatic load-balancing across places.

16. The method according to claim 11, wherein the program of instructions further comprises computer readable program code configured to provide prioritized random work stealing across places where a probability of stealing activities from closer places is higher than a probability of stealing from farther places.

17. The method according to claim 11, wherein the computer readable program code further comprises computer readable program code configured to provide space scheduling utilizing one or more of intra-place work stealing and remote work pushing for general computations.

18. The method according to claim 11, wherein the program of instructions further comprises computer readable program code configured to provide bounded space scheduling for terminally strict computations.

19. The method according to claim 11, wherein the program of instructions further comprises computer readable program code configured to provide a multi-program mode wherein a kernel scheduler changes resources available to a job based on utilization.

20. A computer program product comprising:
a computer readable storage medium having computer readable program code embodied therewith, the computer readable program code comprising:
computer readable program code configured to provide distributed scheduling of multi-place computations for one or more places, the one or more places each comprising one or more processors having shared memory;
wherein to provide distributed scheduling of multi-place computations further comprises providing distributed scheduling for multi-threaded computations with, using a combination of intra-place work-stealing for load balancing and remote work pushing across places for preserving affinity; and
wherein a fresh activity buffer is implemented as a concurrent deque used for keeping new activities spawned from remote places.

* * * * *